(12) United States Patent
Miyasaka et al.

(10) Patent No.: US 8,694,326 B2
(45) Date of Patent: Apr. 8, 2014

(54) COMMUNICATION TERMINAL AND COMMUNICATION METHOD

(75) Inventors: Shuji Miyasaka, Osaka (JP); Kosuke Nishio, Osaka (JP); Ichiro Kawashima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/590,243

(22) Filed: Aug. 21, 2012

(65) Prior Publication Data

US 2012/0323583 A1 Dec. 20, 2012

Related U.S. Application Data

(63) Continuation of application No. PCT/JP2011/000398, filed on Jan. 26, 2011.

(30) Foreign Application Priority Data

Feb. 24, 2010 (JP) ................................. 2010-039337

(51) Int. Cl.
*G10L 21/00* (2013.01)
*H04B 1/38* (2006.01)
*H04M 1/00* (2006.01)
*H04M 3/42* (2006.01)
*H04M 9/08* (2006.01)
*G06F 3/00* (2006.01)
*G06F 15/16* (2006.01)
*G06F 11/00* (2006.01)

(52) U.S. Cl.
USPC ........... 704/500; 704/205; 704/214; 704/219; 704/208; 704/207; 379/390.02; 379/202.01; 379/406.02; 375/222; 710/52; 709/227; 370/235

(58) Field of Classification Search
USPC ......... 704/500, 205, 214, 233, 219, 207, 208; 375/222; 710/52; 379/390.02, 202.01, 379/406.02; 709/227; 370/235
See application file for complete search history.

(56) References Cited

U.S. PATENT DOCUMENTS 5,517,435 A 5/1996 Sugiyama
(Continued)

FOREIGN PATENT DOCUMENTS

CN 101179295 5/2008
(Continued)

OTHER PUBLICATIONS

International Search Report issued Mar. 22, 2011 in International (PCT) Application No. PCT/JP2011/000398.
(Continued)

*Primary Examiner* — Jialong He
*Assistant Examiner* — Neeraj Sharma
(74) *Attorney, Agent, or Firm* — Wenderoth, Lind & Ponack, L.L.P.

(57) ABSTRACT

A communication terminal includes a decoder which decodes an input bitstream received from another communication terminal, to generate an output audio signal and outputs the generated output audio signal to a speaker; and an echo canceller which obtains an input audio signal representing sound captured by a microphone placed in a space to which the speaker outputs the sound, and removes, for respective subbands, an echo component included in the obtained input audio signal and corresponding to the output audio signal, to generate an audio signal for transmission. An encoder codes the audio signal for transmission to generate an output bitstream and transmits the generated output bitstream to another communication terminal; and a control unit controls, for the respective subbands, echo cancellation processing according to a reproduction band of at least one of the output audio signal and the audio signal for transmission.

2 Claims, 16 Drawing Sheets

(56) References Cited

U.S. PATENT DOCUMENTS

| | | | |
|---|---|---|---|
| 5,657,349 A | 8/1997 | Sugiyama | |
| 5,963,901 A * | 10/1999 | Vahatalo et al. | 704/233 |
| 5,995,923 A * | 11/1999 | Mermelstein et al. | 704/219 |
| 6,182,032 B1 * | 1/2001 | Rapeli | 704/214 |
| 6,396,872 B1 | 5/2002 | Sugiyama | |
| 7,668,713 B2 * | 2/2010 | Zinser et al. | 704/219 |
| 7,813,496 B2 * | 10/2010 | Kubin et al. | 379/406.02 |
| 7,822,194 B2 | 10/2010 | Marton | |
| 8,073,147 B2 | 12/2011 | Sugiyama | |
| 8,184,537 B1 * | 5/2012 | Gopal et al. | 370/235 |
| 8,285,554 B2 * | 10/2012 | Gur et al. | 704/500 |
| 8,311,234 B2 | 11/2012 | Sakuraba | |
| 8,433,050 B1 * | 4/2013 | Baten et al. | 379/202.01 |
| 2002/0076034 A1 * | 6/2002 | Prabhu et al. | 379/390.02 |
| 2002/0188731 A1 * | 12/2002 | Potekhin et al. | 709/227 |
| 2004/0095994 A1 * | 5/2004 | Dowling | 375/222 |
| 2004/0215851 A1 * | 10/2004 | LeBlanc et al. | 710/52 |
| 2007/0071254 A1 | 3/2007 | Marton | |
| 2008/0109217 A1 * | 5/2008 | Nurminen | 704/208 |
| 2008/0112568 A1 | 5/2008 | Sakuraba | |
| 2009/0030536 A1 | 1/2009 | Gur et al. | |
| 2009/0281797 A1 * | 11/2009 | Zopf et al. | 704/207 |
| 2010/0211382 A1 * | 8/2010 | Sugiyama | 704/205 |

FOREIGN PATENT DOCUMENTS

| | | |
|---|---|---|
| CN | 101223767 | 7/2008 |
| EP | 1 006 672 | 6/2000 |
| JP | 6-318885 | 11/1994 |
| JP | 7-123028 | 5/1995 |
| JP | 8-079137 | 3/1996 |
| JP | 11-355182 | 12/1999 |
| JP | 2000-216712 | 8/2000 |
| JP | 2001-044896 | 2/2001 |
| JP | 2005-175804 | 6/2005 |
| JP | 2005-333550 | 12/2005 |
| JP | 2006-333062 | 12/2006 |
| WO | 2007/058121 | 5/2007 |

OTHER PUBLICATIONS

Shoji Makino et al., "Subband Echo Canceller with an Exponentially Weighted Stepsize NLMS Adaptive Filter", Journal of the Institute of Electronics, Information and Communication Engineers (IEICE), A, vol. J79-A, No. 6, pp. 1138-1146, Jun. 1996, with partial English translation.

Tomonori Katsumata et al., "Efficient Implimentation of the Fast H∞ Filter and Its Application to Echo Canceller in Cellular Phones", Journal of Signal Processing, vol. 12, No. 2, pp. 143-154, Mar. 2008, with English Abstract.

Chinese Office Action with English translation of Search Report dated Jan. 3, 2014 in Chinese Application No. 201180010497.X.

* cited by examiner

COMMUNICATION TERMINAL AND COMMUNICATION METHOD

CROSS REFERENCE TO RELATED APPLICATIONS

This is a continuation application of PCT Patent Application No. PCT/JP2011/000398 filed on Jan. 26, 2011, designating the United States of America, which is based on and claims priority of Japanese Patent Application No. 2010-039337 filed on Feb. 24, 2010. The entire disclosures of the above-identified applications, including the specifications, drawings and claims are incorporated herein by reference in their entirety.

BACKGROUND OF INVENTION

1. Technical Field

The present invention relates to communication terminals and communication methods for transmitting and receiving audio signals, and particularly relates to a communication terminal and a communication method which transmit an audio signal on which echo cancellation processing has been performed.

2. Background Art

Recent years have seen the development of devices which transmit and receive video for large-screen and audio in high-frequency band to allow users to enjoy high-quality communication and call with a high realistic sensation. In this case, audio is often output from a speaker embedded in a display that displays video. Furthermore, an installation site of such device is expected to be, for example, a conference room in an office, a living room in a house, or a room which is large enough in size to accommodate at least a few people.

In such a case, sound of a speaker at the far end (i.e., in a destination communication terminal) is captured by a microphone at the near end (i.e., in a source communication terminal) and then is transmitted to the far end in form of an echo. In order to remove this echo, the communication terminal includes an echo canceller. The echo canceller here removes an echo which is generated in the case where the speaker and the microphone are located at a distance greater than a distance of those of a mobile phone.

However, the above echo canceller involves an enormous amount of computation as compared to a simple echo canceller which is used, for example, in a conventional mobile phone. For this, there are two causes.

The first cause is that the reproduction band of audio is expanded aiming at high-quality audio communication. Take an example of a mobile phone, the reproduction band is slightly lower than 4 kHz, and the reproduction band of audio which is used in the communication with a high realistic sensation is, for example, 12 kHz.

The second cause is that the echo time is prolonged. In a conventional mobile phone, audio is output form a speaker at an ear and then is captured by a microphone at a mouth, with the result that the echo time is expected to be approximately 30 msec at most. In contrast, a communication system with a high realistic sensation is provided with, as mentioned above, a speaker embedded in a display and adapted to a high volume of sound and a microphone installed in a room. Since the room is large enough in size to accommodate at least a few people, the echo time is expected to be approximately 600 msec.

Generally, in a single echo cancellation scheme, the amount of computation of the echo canceller is proportional to the square of the reproduction band and is further proportional to the expected echo time. In the above example, the reproduction band is three times wider and the echo time is 20 times longer, which means that the required amount of computation is 3×3×20=180 times greater.

The reason why the amount of computation of the echo canceller is proportional to the square of the reproduction band and is further proportional to the expected echo time is as follows.

FIG. 16 shows a basic principle of a conventional echo canceller 10. As shown in FIG. 16, the echo canceller 10 removes an echo originated from the sound output from a speaker 20 and captured by a microphone 30.

Specifically, the echo canceller 10 includes a pseudo-echo generation unit 11 and a subtractor 12, and the pseudo-echo generation unit 11 estimates, using an input signal from the microphone 30 and a reference signal, a transfer function of the space where the speaker 20 and the microphone 30 are placed. The pseudo-echo generation unit 11 then uses, for the estimated transfer function, an adaptive filter having a predetermined number of taps and thereby generates a pseudo echo by driving the adaptive filter. The subtractor 12 then reduces the echo by subtracting, from the input signal captured by the microphone 30, the pseudo echo generated by the pseudo-echo generation unit 11.

Here, the number of taps T of the filter in the transfer function is determined by $T = E \times F$ where E represents the echo time and F represents a sampling frequency of the signal.

The echo canceller 10 processes a filter having ($E \times F$) taps for each sample, which means that the amount of computation per unit time is $(E \times F) \times F$. Thus, the amount of computation of the echo canceller 10 is proportional to the echo time E and is proportional to the square of the sampling frequency F.

There is a subband echo canceller (see Non-Patent Literature 1) as a known technique for reducing an amount of computation of an echo canceller which cancels an echo in the space where a speaker and a microphone are placed at a distance from each other.

The subband echo canceller divides an input signal into a plurality of subband signals and down-samples the input signal at the same time. For example, assume that the signal is divided into 20 subbands and down-sampled to one sixteenth, then the amount of computation is $E \times (F/16) \times (F/16) \times 20 + \alpha$. Here, α represents an amount of computation for the division into the subbands. When α is sufficiently small, the amount of computation can be reduced to 20/256 as compared to a typical echo canceller.

In addition, as a method of further reducing the amount of computation, Patent Literature 1 discloses a technique of a subband echo canceller in which taps of an adaptive filter of an echo canceller in each band are increased and decreased depending on a sound source, to thereby reduce the amount of computation.

CITATION LIST

Patent Literature

[Patent Literature 1] Japanese Unexamined Patent Application Publication No. 6-318885

Non Patent Literature

[Non Patent Literature 1] The Journal of the institute of Electronics, information, and Communication Engineers A vol. J79-A No. 6 pp. 1138 to 1146, June, 1996
[Non-Patent Literature 2] Journal of Signal Processing Vol. 12, No. 2, pp. 143 to 154, March, 2008

SUMMARY OF INVENTION

However, the above conventional technique has a problem of insufficiency of a reduction in the amount of computation of the echo canceller.

For example, in the technique disclosed by Non Patent Literature 1, even in the case of the above example, the amount of computation of the echo canceller in a communication system with a high realistic sensation is 180 times different from that in a conventional mobile phone as a premise, with the result that the amount of computation in the communication system is 180×20/256≈14 times greater than that in the mobile phone.

Furthermore, in the technique disclosed by Patent Literature 1, the processing of adaptively (which means, according to an input signal) increasing and decreasing the order of the filter of the echo canceller in each subband requires some amount of computation.

Thus, the present invention has been devised in view of the above conventional problem and has an object to provide a communication terminal and a communication method which further reduces the amount of computation required for echo cancellation processing.

In order to solve the above problem, a communication terminal according to an aspect of the present invention is a communication terminal which performs audio signal communication with another communication terminal and comprises: a decoding unit configured to (i) decode an input bitstream received from the other communication terminal, to generate an output audio signal and (ii) output the generated output audio signal to a speaker; an echo cancellation unit configured to obtain an input audio signal and remove, for respective subbands, an echo component included in the obtained input audio signal, to generate an audio signal for transmission, the input audio signal representing sound captured by a microphone placed in a space to which the speaker outputs the sound, and the echo component corresponding to the output audio signal generated by the decoding unit; a coding unit configured to (I) code the audio signal for transmission to generate an output bitstream and (ii) transmit the generated output bitstream to the other communication terminal; and a control unit configured to control, for the respective subbands, echo cancellation processing of the echo cancellation unit according to a reproduction band of at least one of the output audio signal and the audio signal for transmission.

With this, the echo cancellation processing is controlled according to a reproduction band of at least one of the output audio signal and the audio signal for transmission, which allows a further reduction in the amount of computation required for echo cancellation processing. This means that it is possible to perform the echo cancellation processing which is suited according to a reproduction band of the audio signal processed by another communication terminal, with the result that the control of avoiding unnecessary echo cancellation processing can be taken to reduce the amount of computation.

Furthermore, it may be possible that the echo cancellation unit generate the audio signal for transmission by applying, for the respective subbands, a filter having a predetermined number of taps to the input audio signal, and the control unit set, for the respective subbands, the number of taps according to the reproduction band of the at least one of the output audio signal and the audio signal for transmission.

By so doing, the number of taps can be adaptively set for respective subbands, with the result that that a filter which is less likely to suffer from inefficiency can be applied in each subband, which allows a reduction in the amount of computation required for echo cancellation processing.

Furthermore, it may be possible that the control unit set, to 0, the number of taps of the filter which is applied in at least one of the subbands that includes a frequency band of a frequency higher than or equal to a frequency in the reproduction band of the at least one of the output audio signal and the audio signal for transmission.

By so doing, a frequency component in a band of a frequency higher than or equal to a frequency in the reproduction band of the audio signal for transmission is not processed by another communication terminal, meaning that it is possible to further reduce the amount of computation by providing a setting that avoids echo cancellation processing on a signal in such a frequency subband as that the transmission of the signal to another communication terminal provides no effect. Alternatively, since the input audio signal does not include an echo component of a frequency component in a band of a frequency higher than or equal to a frequency in the reproduction band of the output audio signal, it is possible to further reduce the amount of computation by providing a setting that avoids unnecessary echo cancellation processing.

Furthermore, it may be possible that the control unit perform the echo cancellation processing only in part of the subbands that includes a frequency band of a frequency lower than or equal to a frequency in the reproduction band of the at least one of the output audio signal and the audio signal for transmission.

By so doing, only a frequency component in a band lower than or equal to the reproduction band of the audio signal for transmission is processed by another communication terminal, meaning that it is possible to further reduce the amount of computation by providing a setting that performs echo cancellation processing only on a signal which is in such a frequency subband as to be transmitted to another communication terminal. Alternatively, since the input audio signal includes only an echo component of a frequency component in a band lower than or equal to the reproduction band of the output audio signal, it is possible to further reduce the amount of computation by providing a setting that avoids unnecessary echo cancellation processing.

Furthermore, it may be possible that the control unit further include a determination unit configured to determine a type of a codec which is used by the other communication terminal in coding or decoding an audio signal, to determine the reproduction band of the at least one of the output audio signal and the audio signal for transmission, and the control unit control the echo cancellation processing according to the reproduction band determined by the determination unit.

With this, it is possible to determine a reproduction band by just determining a type of a codec, which allows a significant reduction in the amount of computation required for echo cancellation processing as compared to the case of determining the number of taps from the input audio signal.

Furthermore, it may be possible that the control unit further includes a determination unit determine a sampling frequency which is used by the other communication terminal, to determine the reproduction band of the at least one of the output audio signal and the audio signal for transmission, and the control unit control the echo cancellation processing according to the reproduction band determined by the determination unit.

With this, it is possible to determine a reproduction band by just determining a sampling frequency, which allows a significant reduction in the amount of computation required for echo cancellation processing as compared to the case of determining the number of taps from the input audio signal.

Furthermore, it may be possible that the input bitstream include a parameter indicating the reproduction band of the output audio signal, the decoding unit decode the input bitstream to generate the output audio signal and the parameter, and the control unit further control the echo cancellation processing according to a reproduction band indicated by the parameter generated by the decoding unit.

By so doing, the reproduction band indicated by the parameter is used, which allows a significant reduction in the amount of computation required for echo cancellation processing as compared to the case of determining the number of taps from the input audio signal.

Furthermore, it may be possible that the control unit further determine the reproduction band of the audio signal for transmission, and control, for the respective subbands, the echo cancellation processing according to the determined reproduction band when an amount of computation in processing performed by the communication terminal exceeds a predetermined threshold.

By so doing, even when the amount of computation increases, the echo cancellation processing can be performed with a small amount of computation.

Furthermore, it may be possible that the communication terminal further comprise a band limiting unit configured to limit the reproduction band of the output audio signal and output, to the speaker, an output audio signal in the limited reproduction band, and the control unit further determine the reproduction band which is limited by the band limiting unit, and control, for the respective subbands, the echo cancellation processing according to the determined reproduction band when an amount of computation in processing performed by the communication terminal exceeds a predetermined threshold.

By so doing, even when the amount of computation increases, the frequency band of audio which is output from the communication terminal is limited so that without limiting a frequency band of a signal which is transmitted to another communication terminal, the echo cancellation processing can be performed with a small amount of computation, with the result that audio degradation which may occur at another communication terminal can be reduced.

Furthermore, it may be possible that the communication terminal further comprise an instruction unit configured to transmit an instruction to the other communication terminal when an amount of computation in processing performed by the communication terminal exceeds a predetermined threshold, the instruction being an instruction for limiting a reproduction band of an audio signal which is used by the other communication terminal in generating the input bitstream.

By so doing, even when the amount of computation increases, the frequency band of audio which is output from the communication terminal is limited at another communication terminal so that without limiting a frequency band of a signal which is transmitted to another communication terminal, the echo cancellation processing can be performed with a small amount of computation, with the result that audio degradation which may occur at another communication terminal can be reduced.

Furthermore, a communication terminal according to an aspect of the present invention is a communication terminal which performs audio signal communication with another communication terminal and comprises: a decoding unit configured to (i) decode an input bitstream received from the other communication terminal, to generate an output audio signal and (ii) output the generated output audio signal to a speaker; an echo cancellation unit configured to obtain an input audio signal and remove, for respective subbands, an echo component included in the obtained input audio signal, to generate an audio signal for transmission, the input audio signal representing sound captured by a microphone placed in a space to which the speaker outputs the sound, and the echo component corresponding to the output audio signal generated by the decoding unit; a coding unit configured to (i) code the audio signal for transmission to generate an output bitstream and (ii) transmit the generated output bitstream to the other communication terminal; and a control unit configured to control, for the respective subbands, echo cancellation processing of the echo cancellation unit according to an amount of computation in processing performed by the communication terminal.

By so doing, even when the amount of computation increases, the echo cancellation processing can be performed with a small amount of computation.

Furthermore, it may be possible that the echo cancellation unit generate the audio signal for transmission by applying, for the respective subbands, a filter having a predetermined number of taps to the input audio signal, and the control unit set, for the respective subbands, the number of taps according to the amount of computation.

With this, the number of taps can be adaptively set for respective subbands, which allows a reduction in the amount of computation required for echo cancellation processing.

Furthermore, it may be possible that the control unit set the number of taps of the filter to 0 when the amount of computation exceeds a predetermined threshold, the filter being applied in at least one of the subbands that includes a highest-frequency band and does not include a lowest-frequency band.

By so doing, no echo cancellation processing is performed for a high frequency band in which an echo has a small impact, with the result that even when the amount of computation increases, it is possible to reduce the amount of computation, and since the echo cancellation processing is performed for a low frequency band in which an echo has a large impact, it is also possible to generate an audio signal with echoes removed.

Furthermore, it may be possible that the control unit perform the echo cancellation processing only in at least one of the subbands when the amount of computation exceeds a predetermined threshold, the at least one subband including a lowest-frequency band and not including a highest-frequency band.

By so doing, no echo cancellation processing is performed for a high frequency band in which an echo has a small impact, with the result that even when the amount of computation increases, it is possible to reduce the amount of computation, and since the echo cancellation processing is performed for a low frequency band in which an echo has a large impact, it is also possible to generate an audio signal with echoes removed.

It is to be noted that the present invention can be implemented not only as the communication terminal, but also as a method which includes, as steps, the processing units included in the communication terminal.

Furthermore, part or all of the constituents included in each of the above communication terminals may be provided in one system large scale integration (LSI). The system LSI is a super multifunctional LSI manufactured by integrating plural components into one chip and is specifically a computer system which includes a microprocessor, a read only memory (ROM), a random access memory (RAM) and so on.

In the communication terminal and the communication method according to an aspect of the present invention, the amount of computation required for echo cancellation processing can be reduced.

BRIEF DESCRIPTION OF DRAWINGS

These and other objects, advantages and features of the invention will become apparent from the following description thereof taken in conjunction with the accompanying drawings that illustrate a specific embodiment of the present invention.

DETAILED DESCRIPTION OF INVENTION

With reference to the drawings, a communication terminal and a communication method according to the present invention are described in detail below.

Embodiment 1

A communication terminal according to Embodiment 1 is a communication terminal which communicates an audio signal with another communication terminal and is characterized by comprising: an echo cancellation unit which obtains an input audio signal representing sound captured by a microphone and removes, for respective subbands, an echo component which is included in the obtained input audio signal and corresponds to an output audio signal provided from a speaker, to generate an audio signal for transmission; and a control unit which controls echo cancellation processing according to a reproduction band of at least one of the output audio signal and the audio signal for transmission. In other words, the communication terminal according to Embodiment 1 controls echo cancellation processing according to a reproduction band of an audio signal which is processed by another communication terminal, that is, an audio signal which is to be coded or decoded, for example.

Figure 1:
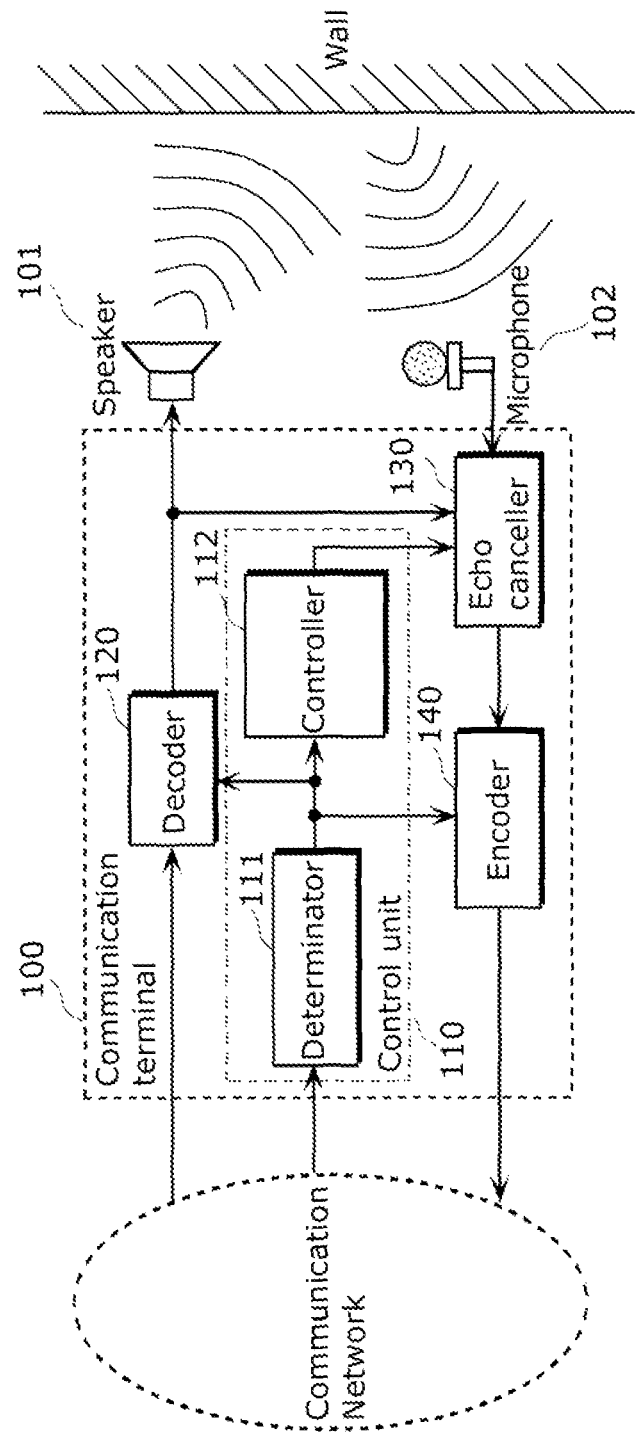
FIG. 1 is a block diagram showing an example of a structure of a communication terminal according to Embodiment 1.

FIG. 1 shows an example of a structure of a communication terminal 100 according to Embodiment 1. The communication terminal 100 communicates with another communication terminal via a communication network such as the Internet to provide a video phone call, a video conference, or the like with a high realistic sensation. The communication terminal 100 outputs, to a speaker 101, an audio signal received from another communication terminal, and transmits, to another communication terminal, an audio signal representing sound captured by a microphone 102.

As shown in FIG. 1, the communication terminal 100 includes a control unit 110, a decoder 120, an echo canceller 130, and an encoder 140.

The control unit 110 controls, for the respective subbands, echo cancellation processing of the echo canceller 130 according to a reproduction band of an output audio signal provided by the decoder 120 or an audio signal for transmission which is to be coded by the encoder 140. In other words, the control unit 110 controls echo cancellation processing according to a reproduction band of an audio signal which is processed by another communication terminal. As shown in FIG. 1, the control unit 110 includes a determinator 111 and a controller 112.

The determinator 111 determines a type of a codec which is present at a far end (another communication terminal). Specifically, the determinator 111 determines a type of a codec which another communication terminal uses to code an audio signal to generate an input bitstream that is received by the communication terminal 100 or which another communication terminal uses to decode an output bitstream that is outputted by the communication terminal 100.

For example, the determinator 111 determines which type of an encoder another communication terminal uses to code an audio signal to compress it. The type of a codec includes, for example, G. 729 or G. 711 as a commonly used type, and advance audio coding (AAC) or adaptive multi-rate-wideband (AMR-WB) as a recent high sound quality type.

When the communication terminal 100 establishes communication with another communication terminal, for example, the determinator 111 determines a reproduction band of an audio signal by determining a type of a codec which another communication terminal uses. For example, when the type of a codec is G. 711 or G. 729, the sampling frequency and the reproduction band will be determined according to the standard. Specifically, when the type of a code is G. 711 or G. 729, it shows that the sampling frequency of a signal input to the encoder is 8 kHz and the reproduction band of the signal is 4 kHz.

On the other hand, in the case of AAC, AMR-WB, and the like type, there is a plurality of selectable sampling frequencies, with the result that the use of a type of a codec only does not allow the determinator 111 to determine a reproduction band of an audio signal. Thus, the determinator 111 determines a reproduction band of an audio signal by determining a sampling frequency which is used by another communication terminal. Since the reproduction band is basically half the sampling frequency, the determinator 111 obtains, from another communication terminal, information indicating the sampling frequency and thereby is able to determine the reproduction band.

Furthermore, the determinator 111 determines which decoding scheme can be used by another communication terminal. For example, the determinator 111 determines whether or not another communication terminal can use the G. 711 scheme or the G. 729 scheme. Furthermore, in the case where another communication terminal can use AMR-WB or AAC, the determinator 111 determines at how many kHz an available sampling frequency is.

This way the determinator 111 determines a reproduction band of an audio signal by determining a type of a codec and/or a sampling frequency which are/is used by another communication terminal at the time of coding or decoding. Here, the reproduction band of the audio signal is a reproduction band of an output audio signal which is provided by the decoder 120, or is a reproduction band of an audio signal for transmission which is input to the encoder 140.

The controller 112 controls, for the respective subbands, echo cancellation processing of the echo canceller 130 according to a reproduction of the output audio signal or the audio signal for transmission. Specific operations of the controller 112 will be described later.

The decoder 120 is an example of a decoding unit according to an implementation of the present invention, which generates an output audio signal by decoding an input bitstream received from another communication terminal and outputs the generated output audio signal to the speaker 101. Specifically, the decoder 120 decodes the input bitstream using a codec of the type determined by the determinator 111.

It is to be noted that the speaker 101 converts, into an audible signal, the output audio signal provided from the decoder 120, and outputs, to a space, the audible signal resulting from such conversion. Here, the space is a space in which the speaker 101 and the microphone 102 are placed and is a space within such a range that the audible signal representing sound output from the speaker 101 is captured by the microphone 102.

Thus, the microphone 102 captures audio which is on the near-end (the communication terminal 100) side and includes the audio signal output from the speaker 101. The input audio signal, which represents sound captured by the microphone 102, is output to the echo canceller 103. It is to be noted that the input audio signal includes an echo component which corresponds to the output audio signal generated by the decoder 120. Here, the echo component includes a signal representing sound which comes from the speaker 101 and is directly captured by the microphone 102 and a signal representing sound which comes from the speaker 101, is reflected off a wall or the like, and is then captured by the microphone 102.

The echo canceller 130 is an example of an echo cancellation unit according to an implementation of the present invention, which generates an audio signal for transmission by removing, for the respective subbands, the echo component included in the input audio signal. The echo canceller 130 operates as controlled by the controller 112 for the respective subbands, Specific structure and operations of the echo canceller 130 will be described later.

The encoder 140 is an example of a coding unit according to an implementation of the present invention, which codes the audio signal for transmission to generate an output bitstream and transmits the generated output bitstream to another communication terminal. Specifically, the encoder 140 codes the input bitstream using a codec of the type determined by the determinator 111. In other words, the encoder 140 obtains information indicating a type of a decoder located at the far end (another communication terminal) and selects an appropriate encoder from among encoders of the type indicated in the obtained information.

Next, operations of the communication terminal 100 according to Embodiment 1 are described. Specifically, operations of the echo canceller 130 and the controller 112 are described.

Figure 2:
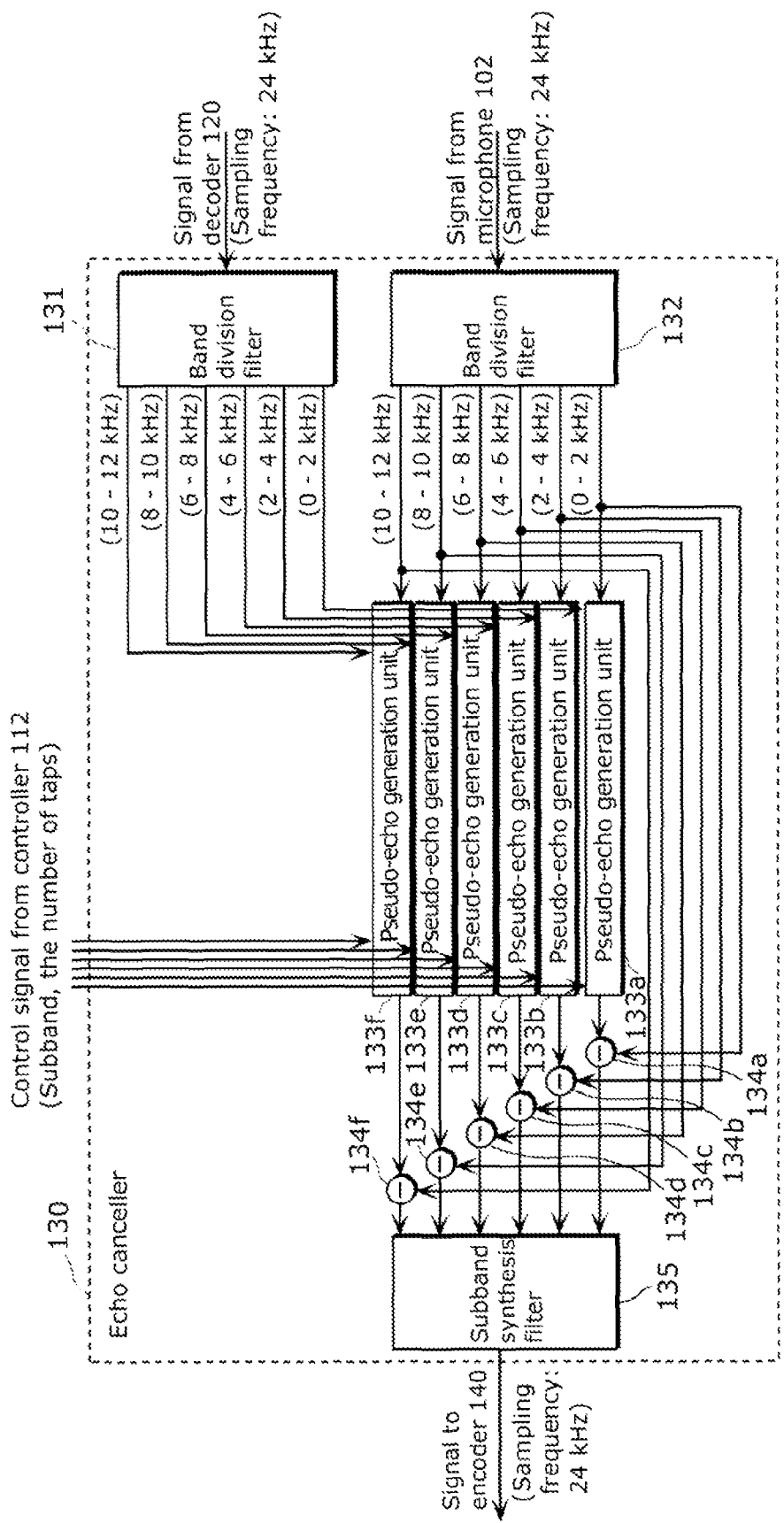
FIG. 2 is a block diagram showing an example of a detailed functional structure of an echo canceller according to Embodiment 1.

FIG. 2 is a block diagram showing an example of a detailed functional structure of the echo canceller 130 according to Embodiment 1.

It is to be noted that signals which are input to the echo canceller 130 include a pulse-code modulation (PCM) signal (a reference signal, that is, the output audio signal) coming from the decoder 120, a PCM signal (the input audio signal) coming from the microphone 102, and a control signal coming from the controller 112. Furthermore, an output signal (the audio signal for transmission) from the echo canceller 130 is a PCM signal which is directed to the encoder 140.

In FIG. 2, as an example, the sampling frequency of the reference signal is 24 kHz (the reproduction band of the reference signal is 12 kHz), the sampling frequency of the signal from the microphone 102 is 24 kHz (the reproduction band of the signal is 12 kHz), and the sampling frequency of the signal to the encoder 140 is 24 kHz, all of which are not always taken in a limiting sense.

The echo canceller 130 includes band division filters 131 and 132, pseudo-echo generation units 133a to 133f, subtractors 134a to 134f, and a subband synthesis filter 135.

The band division filter 131 divides the PCM signal (the output audio signal) input from the decoder 120, into different bands (a plurality of subbands), and downsamples the signals. The signals resulting from the band division are output to the pseudo-echo generation units 133a to 133f according to the respective frequency bands (subbands).

The band division filter 132 divides the PCM signal (the input audio signal) input from the microphone 102, into different bands (a plurality of subbands), and downsamples the signals. The signals resulting from the band division are output to the pseudo-echo generation units 133a to 133f according to the respective frequency bands (subbands). It is to be noted that in the band division filter 132, the number of subbands and a sampling rate of the downsampling are desirably equal to those in the band division filter 131.

Although FIG. 2 shows an example in which the signal is divided into six subbands, the present invention is not limited to this example. For example, the signal may be divided into 16 subbands or 32 subbands. Furthermore, the sampling rate of the downsampling may have any value as long as it is equal to or less than a value which corresponds to the number of subbands. For example, in the case of division into 10 subbands, the downsampling rate may be one tenth (10 sampling), one eighth (8 sampling), and so on.

Each of the pseudo-echo generation units 133a to 133f estimates, using the input signal from the microphone 102 and the reference signal from the decoder 120, a transfer function of the space where the audible signal output from the speaker 101 propagates, and then uses, for the estimated transfer function, an adaptive filter having a predetermined number of taps, to generate a pseudo echo by driving the adaptive filter. Here, the pseudo-echo generation units 133a to 133f have respective adaptive filters for signals in subbands allocated thereto, to generate pseudo echoes. In this embodiment, the pseudo echoes may be generated in any known method (for example, in the method disclosed by Non Patent Literature 2).

It is to be noted that each of the pseudo-echo generation units 133a to 133f sets the number of taps of the filter for a corresponding subband based on the control signal input from the controller 112. Specific operations based on the control signal input from the controller 112 will be described later.

The subtractors 134a to 134f reduce echoes by subtracting, from the signal input from the microphone 102, the pseudo echoes generated by the pseudo-echo generation units 133a to 133f.

The subband synthesis filter 135 generates a time-axis audio signal for transmission by synthesizing, into a single band, the signals in the respective subbands resulting from the above echo removal.

Subsequently, how the echo canceller 130 configured as above operates based on the control signal input from the controller 112 is described below.

Figure 3:
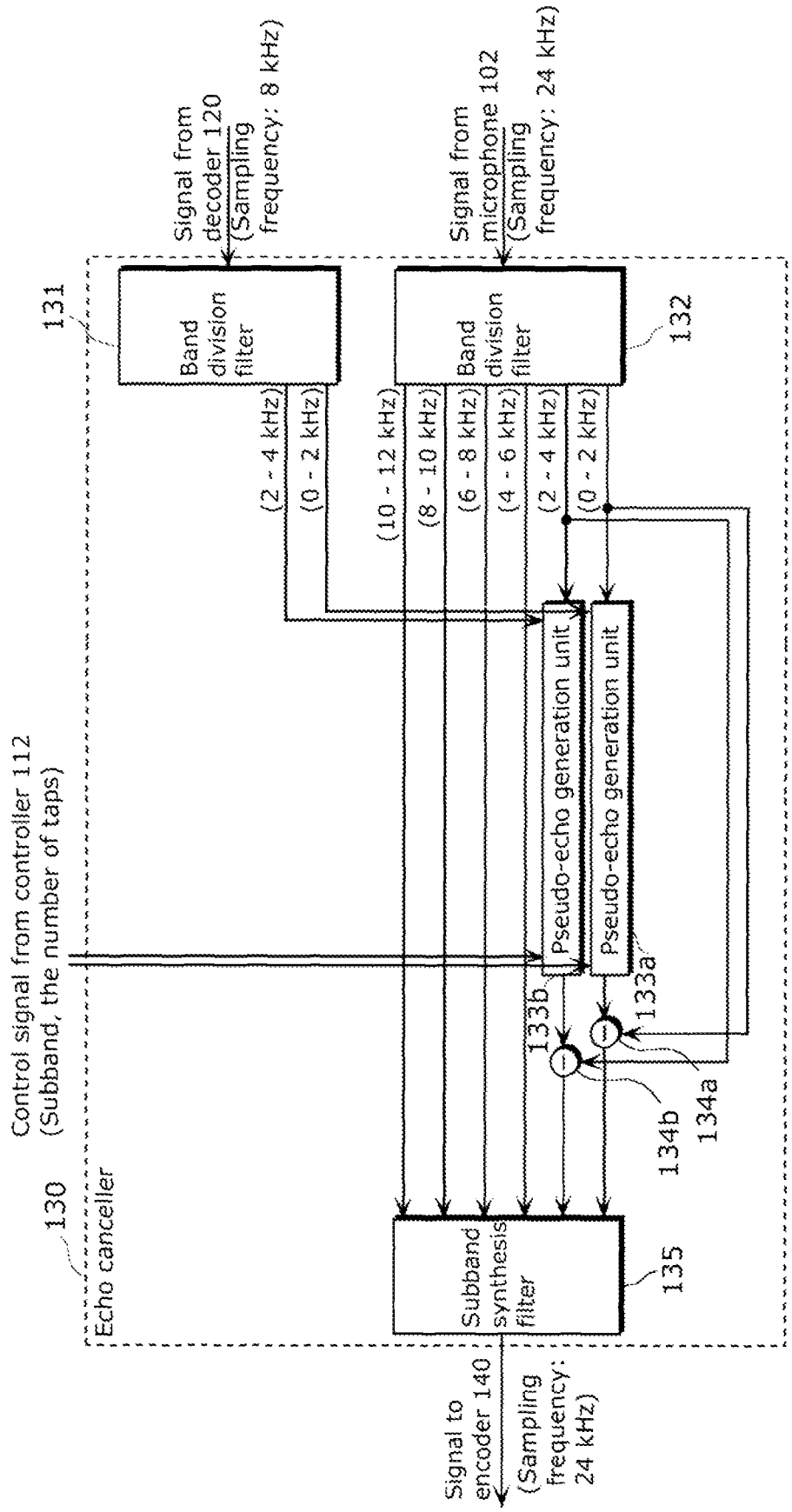
FIG. 3 is a view for explaining an example of an operation of the echo canceller according to Embodiment 1.

First, with reference to FIG. 3, the following describes the operation of the controller 112 which controls echo cancellation processing of the echo canceller 130 based on a reproduction band of the audio output signal, that is, an audio signal coded at the far end (another communication terminal). FIG. 3 shows an example of the functional structure of the echo canceller 130 where the sampling frequency of the output audio signal which is received from the decoder 120 is 8 kHz, and the sampling frequency of the audio signal for transmission which is output to the encoder 140 is 24 kHz.

Such a situation occurs when the determinator 111 determines that the encoder at the far end is, for example, G. 711, and the decoder at the far end is, for example, AMR-WB in 24 kHz mode. In this case, since the sampling frequency of the audio signal for transmission which is output to the encoder 140 needs to be set to 24 kHz, the controller 112 controls the echo canceller 130 so that the echo canceller 130 processes the subband signals which are in the band range of 0 to 12 kHz. In the example shown in FIG. 3, the input audio signal is divided by the band division filter 132 into six subbands as in the case of FIG. 2.

In the meantime, since the sampling frequency of the output audio signal (the reference signal) from the decoder 120 is 8 kHz, meaning that the reproduction band of the output audio signal is 4 kHz at the highest, an echo included in the input audio signal which is received from the microphone 102 is in the frequency band below 4 kHz. Thus, only two subbands (0-2 kHz and 2-4 kHz) are the band in which a signal needs to be subject to the echo cancellation processing.

Accordingly, the controller 112 controls the echo canceller 130 so that the echo canceller 130 does not perform echo cancellation processing on the signals which are in subbands above 4 kHz. Specifically, the controller 112 sets, to 0, the number of taps of a filter of each of the pseudo-echo generation units 133c to 133f which processes a frequency component in a subband above 4 kHz. Alternatively, the controller 112 may set the number of taps to so small a value that an amount of computation of the echo cancellation processing is negligible.

Incidentally, since an echo signal is attenuated more in a high-frequency band than in a low-frequency band, the controller 112 may set the number of taps of a filter for high-frequency-echo cancellation processing to be lower than the number of taps of a filter for low-frequency-echo cancellation processing. Specifically, in this embodiment, since the echo cancellation processing is performed on the signals in the two low-frequency subbands, the controller 112 may set the number of taps of a filter for 0 to 2 kHz bands which the pseudo-echo generation unit 133a applies, to be larger than the number of taps of a filter for 2 to 4 kHz bands which the pseudo-echo generation unit 133b applies.

As above, under control of the controller 112, the echo cancellation processing is performed only in part of the subbands that includes a frequency band lower than or equal to the reproduction band of the output audio signal, that is, the reproduction band of the audio signal coded at the far end. For example, the controller 112 sets, to 0, the number of taps of the filter which is applied in at least one of the subbands that includes a frequency band of a frequency higher than or equal to a frequency in the reproduction band of the output audio signal. Specifically, the controller 112 sets, to 0, the number of taps of the filter which is applied in all the subbands that include a frequency band of a frequency higher than or equal to a frequency in the reproduction band of the output audio signal. By so doing, the frequency band of a signal to be transmitted to the far end will not be adversely affected and moreover, the bands of signals subject to the echo cancellation processing can be minimized, which makes it possible to provide communication terminal and method with which an amount of computation is small and sound quality is high.

Figure 4:
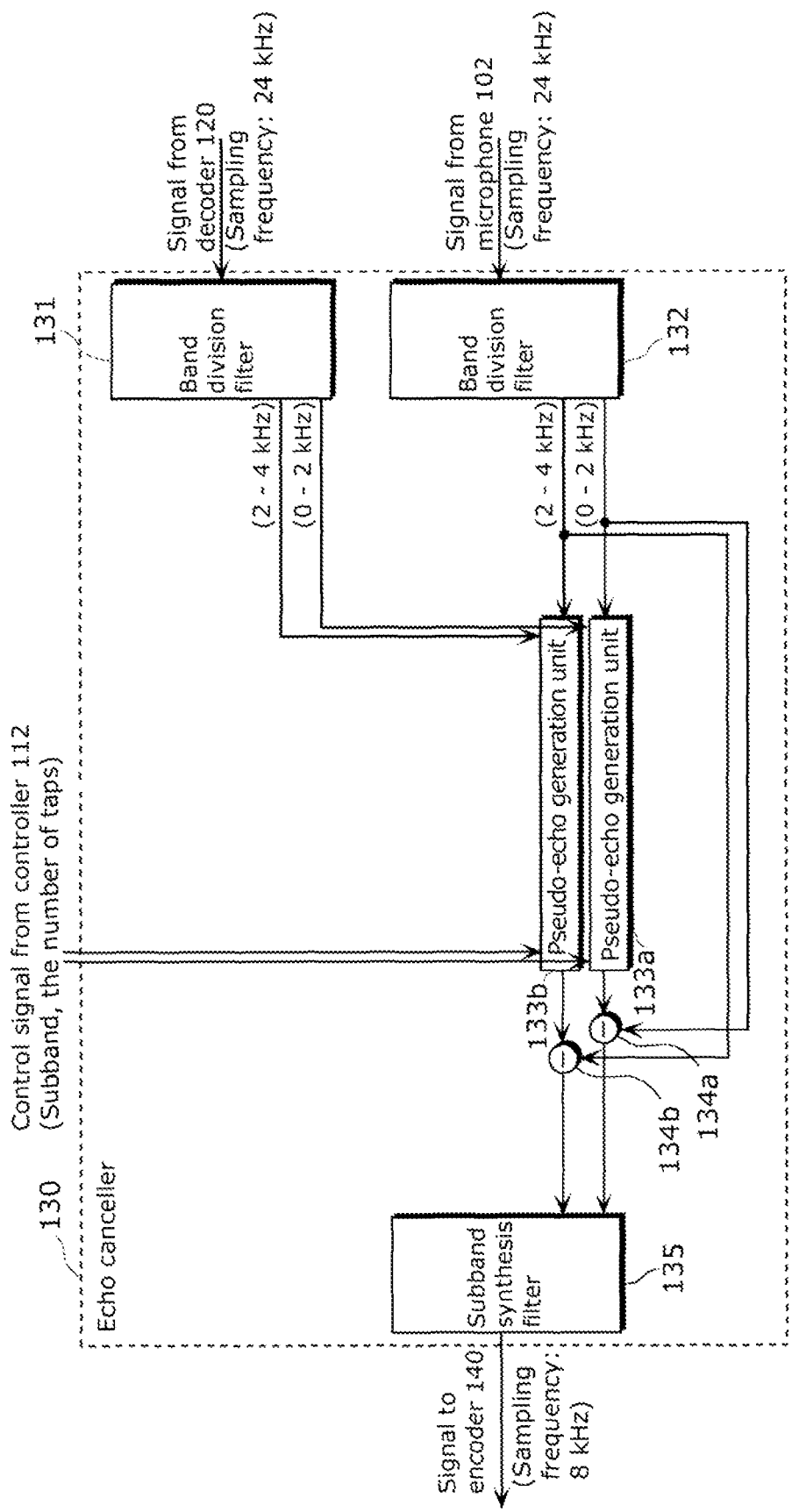
FIG. 4 is a view for explaining another example of the operation of the echo canceller according to Embodiment 1.

In the above-described example shown in FIG. 3, the reproduction band (4 kHz) of the output audio signal is lower than the reproduction band (12 kHz) of the audio signal for transmission. The following shall describe, with reference to FIG. 4, an example in which the reproduction band of the audio signal for transmission is lower than the reproduction band of the output audio signal. FIG. 4 shows an example of the functional structure of the echo canceller 130 where the sampling frequency of the output audio signal which is received from the decoder 120 (the signal which is coded at the far end) is 24 kHz, and the sampling frequency of the audio signal for transmission which is output to the encoder 140 (the signal which is decoded at the far end) is 8 kHz.

In this case, since the reproduction band of the output audio signal is 12 kHz, the frequency band of an echo contained in the input audio signal received from the microphone 102 is lower than or equal to 12 kHz. However, in the example shown in FIG. 4, since the reproduction band of the audio signal for transmission which is transmitted to the far end is equal to or lower than 4 kHz, it is sufficient that the echo cancellation processing is performed only on a signal in a band lower than or equal to 4 kHz. Specifically, the controller 112 sets, to 0 (or a sufficiently small value), the number of taps of a filter of each of the pseudo-echo generation units 133c to 133f which processes a frequency component in a subband above 4 kHz.

This is ultimately the same as that described with reference to FIG. 3 except that an input to the subband synthesis filter 135 is only a signal on which the echo cancellation processing has been performed. This is because high-frequency components will be synthesized in vain for the reason that the high-frequency components cannot be reproduced at the far end.

As above, the control unit 110 controls the echo canceller 130 so that the echo cancellation processing is performed only in part of the subbands that includes a frequency lower than or equal to the reproduction band of the audio signal for transmission, that is, the reproduction band of an audio signal which is decoded at the far end. For example, the control unit 110 sets, to 0, the number of taps of the filter which is applied in at least one of the subbands that includes a frequency band of a frequency higher than or equal to a frequency in the reproduction band of the audio signal for transmission. Specifically, the control unit 110 sets, to 0, the number of taps of the filter which is applied in all the subbands that include a frequency band of a frequency higher than or equal to a frequency in the reproduction band of the audio signal for transmission. By so doing, the frequency band of a signal to be transmitted to the far end will not be adversely affected and moreover, the bands of signals subject to the echo cancellation processing can be minimized, which makes it possible to provide communication terminal and method with which an amount of computation is small and sound quality is high.

The foregoing has described the configuration in which whether to perform the echo cancellation processing is determined for the respective subbands, based on one of the reproduction band of the output audio signal and the reproduction band of the audio signal for transmission. In this regard, the control unit 110 may compare the reproduction band of the output audio signal and the reproduction band of the audio signal for transmission and determine based on a lower one of these reproduction bands whether to perform the echo cancellation processing.

When the reproduction band of the output audio signal is lower than the reproduction band of the audio signal for transmission, the input audio signal does not include echoes in frequency bands higher than or equal to the reproduction band of the output audio signal, which means that it is sufficient that the echo cancellation processing is performed only in part of the subbands that includes a frequency band lower than or equal to the reproduction band of the output audio signal. When the reproduction band of the audio signal for transmission is lower than the reproduction band of the output audio signal, the echo cancellation processing on a signal in a frequency band of a frequency higher than or equal to a frequency in the reproduction band of the audio signal for transmission will be in vain since such signal is not transmitted to the far end, which means that it is sufficient that the echo cancellation processing is performed only in part of the subbands that includes a frequency band lower than or equal to the reproduction band of the audio signal for transmission.

Figure 5:
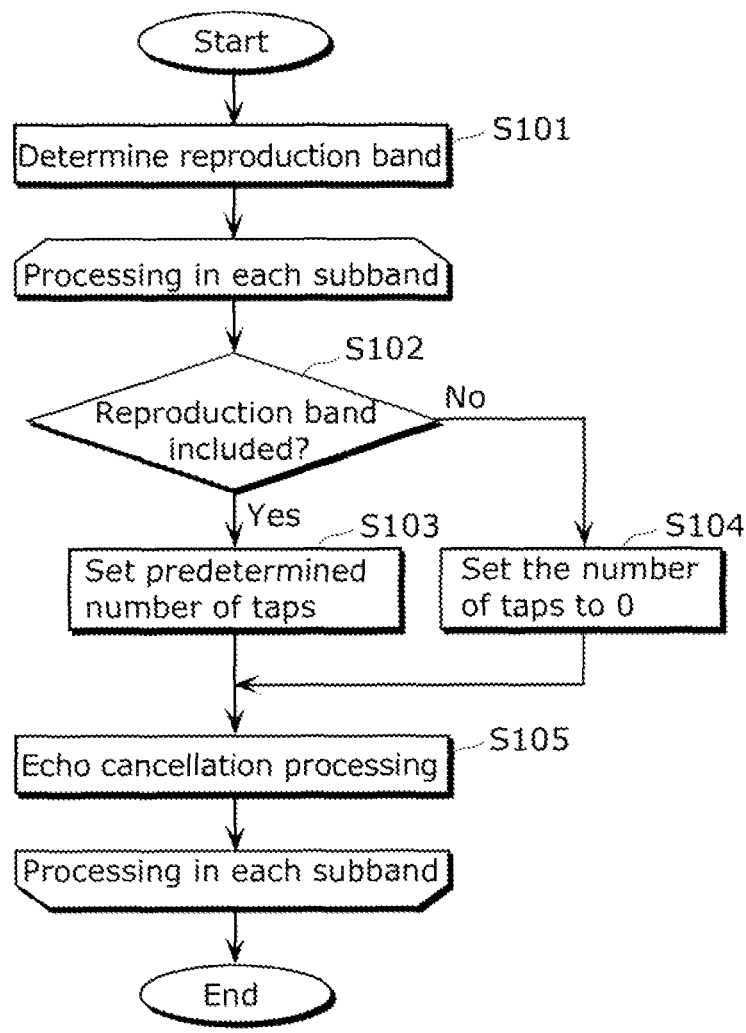
FIG. 5 is a flowchart showing an example of echo cancellation processing according to Embodiment 1.

Next, an example of the echo cancellation processing in the communication terminal 100 according to Embodiment 1 is described with reference to FIG. 5. FIG. 5 is a flowchart showing an example of the echo cancellation processing according to Embodiment 1.

First, the determinator 111 determines reproduction bands of the output audio signal and the audio signal for transmission (S101). Specifically, the determinator 111 obtains, as described above, a type of a codec, that is, each of an encoder and a decoder, and a sampling frequency, which are used at the far end (another communication terminal), to determine the reproduction bands.

Next, the controller 112 and the echo canceller 130 repeat the following processing for each subband. For example, the controller 112 and the echo canceller 130 perform the processing sequentially in ascending order of subband frequency.

The controller 112 determines whether or not the subband includes the reproduction band (S102). For example, when, just as the 0 to 2 kHz subband shown in FIG. 3 or FIG. 4, the subband includes the reproduction band (Yes in S102), the controller 112 controls the echo canceller 130 so that a predetermined number of taps is set (S103). Here, the predetermined number of taps may be a fixed value that is predetermined.

When, just as the 10 to 12 kHz subband shown in FIG. 3 or FIG. 4, the subband does not include the reproduction band (No in S102), the controller 112 controls the echo canceller 130 so that the number of taps is set to 0 (S104).

The echo canceller 130 then applies the filter having the set number of taps to the input audio signal which has been divided into subbands, thereby performing the echo cancellation processing (S105).

It is to be noted that the processing in each subband may be performed sequentially as shown in the flowchart of FIG. 5 or may alternatively be performed in parallel processing.

As above, the communication terminal 100 according to Embodiment 1 is capable of reducing the amount of processing by changing, according to the processing capability of the far end, the way to treat a subband signal. Specifically, the communication terminal 100 according to Embodiment 1 determines, based on a type of a codec, a sampling frequency, or the like which is used by another communication terminal, a reproduction band of an audio signal which is processed by another communication terminal, and controls echo cancellation processing based on the determined reproduction band, which allows a reduction in the amount of computation required for echo cancellation processing.

In Embodiment 1 described above, the following sampling frequency was specified first, and half the sampling frequency was specified as the reproduction band: a sampling frequency which can be directly specified from a codec type determined by the determinator 111; or a sampling frequency of a signal at the time of coding. However, in the case of some recent codec, the reproduction band cannot be accurately determined from the sampling frequency and instead is accurately determined from a parameter included in an input bitstream.

Figure 6:
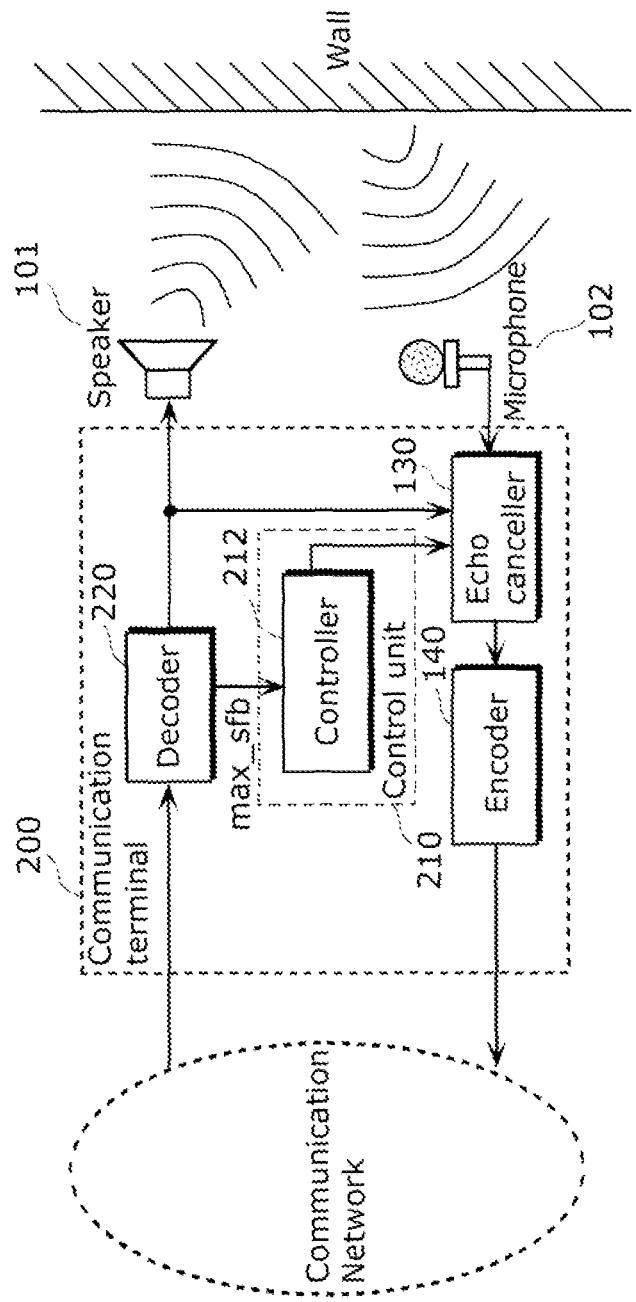
FIG. 6 is a block diagram showing another example of the structure of the communication terminal according to Embodiment 1.

FIG. 6 is a block diagram showing another example of the structure of the communication terminal according to Embodiment 1. A communication terminal 200 shown in FIG. 6 is different from the communication terminal 100 shown in FIG. 1 in that a control unit 210 is provided instead of the control unit 110 and a decoder 220 is provided instead of the decoder 120. Specifically, the control unit 210 is different in that a controller 212 is provided instead of the controller 112 and the determinator 111 is not provided. The following description omits features the same as those described with reference to FIG. 1 to focus on differences therefrom.

The decoder 220 is an example of a decoding unit according to an implementation of the present invention, which generates an output audio signal and a parameter by decoding an input bitstream which includes a parameter indicating a reproduction band of the output audio signal. For example, the input bitstream coded in the AAC scheme includes a parameter "max_sfb" indicating an upper limit of the reproduction band. Accordingly, the decoder 220 decodes such input bitstream and outputs the parameter "max_sfb" to the controller 212.

The controller 212 obtains the parameter "max_b" from the decoder 220 and determines, as the upper limit of the reproduction band, a value indicated by the obtained parameter "max_sfb". The controller 212 then controls the echo canceller 130 according to the determined reproduction band. Such control on the echo canceller 130 at this time is the same as the operation which the controller 112 shown in FIG. 1 performs.

Figure 7:
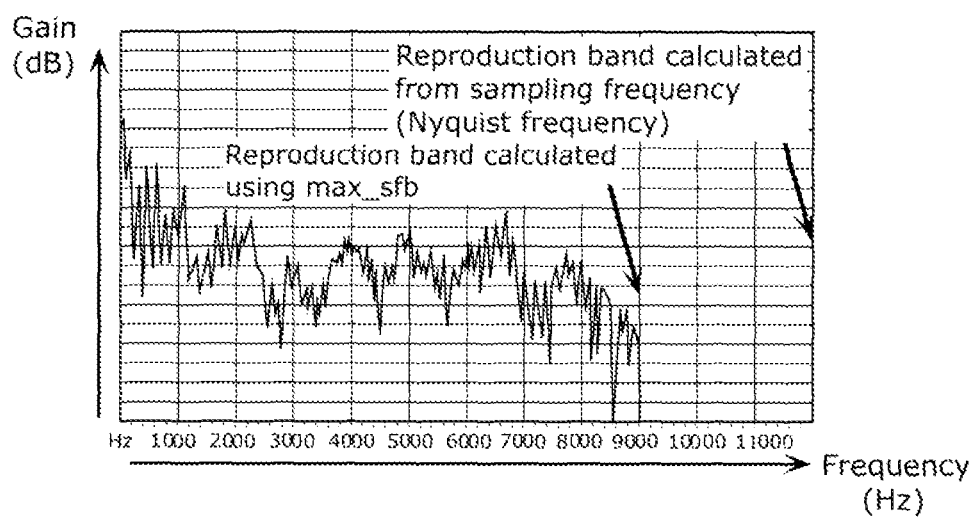
FIG. 7 shows an example of frequency characteristics of an output audio signal according to Embodiment 1.

FIG. 7 shows an example of frequency characteristics of an output audio signal. As shown in FIG. 7, a reproduction band (Nyquist frequency) determined from the sampling frequency and a reproduction band determined from "max_sfb" have a relationship.

Here, the reproduction band determined from the sampling frequency is 12 kHz, and the reproduction band determined from "max_sfb" is 9 kHz. Thus, the input audio signal in the 9 to 12 kHz band received from the microphone 102 does not contain echoes, and the controller 212 therefore sets, to 0, the number of taps of a filter of the pseudo-echo generation unit 133f shown in FIG. 2.

Figure 8:
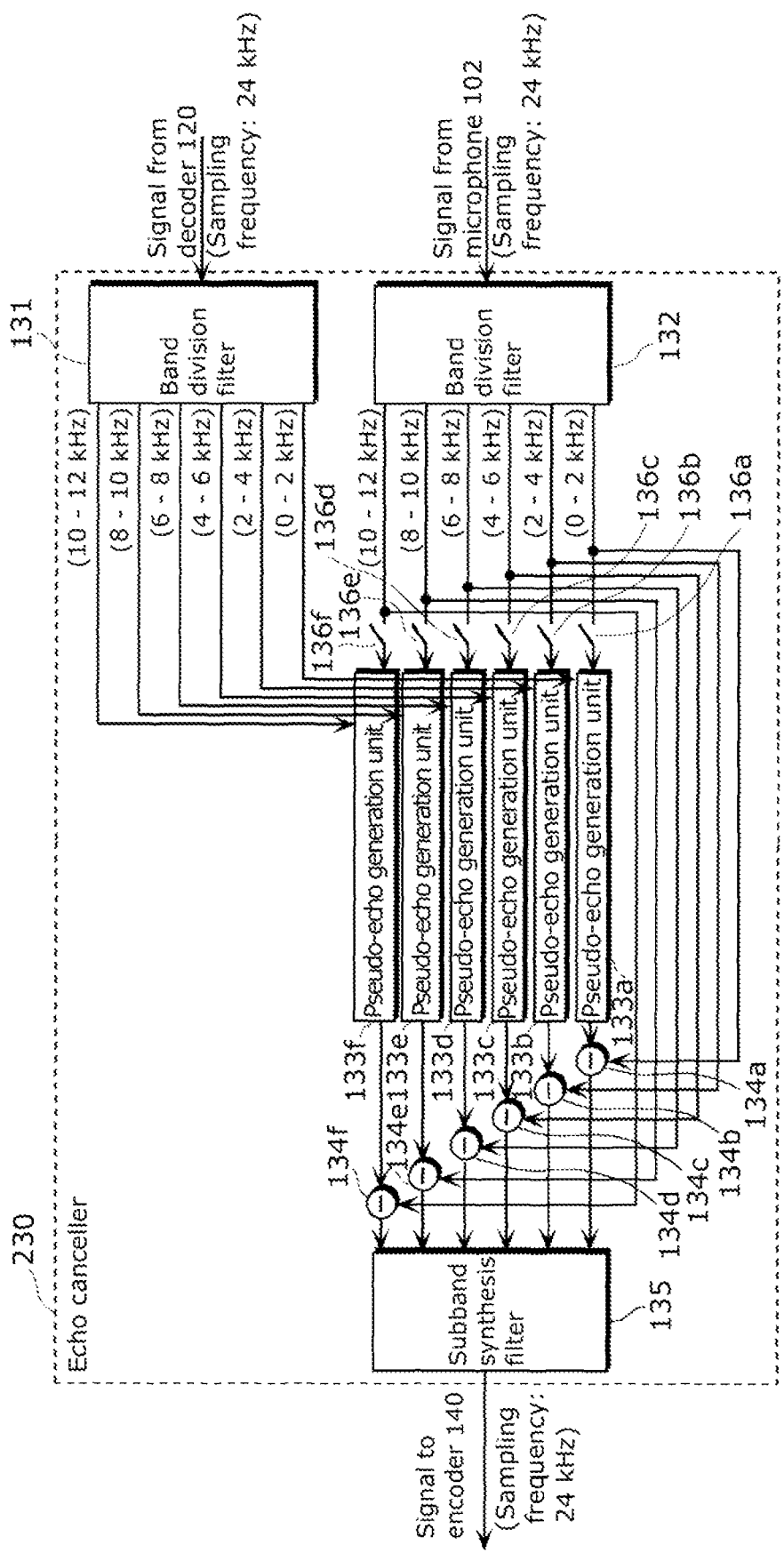
FIG. 8 is a block diagram showing another example of the detailed functional structure of the echo canceller according to Embodiment 1.

In Embodiment 1 described above, the controller 112 or 212 sets, for example, to 0, the number of taps of a filter which is applied at the time of pseudo-echo generation, to reduce the amount of computation required for echo cancellation processing. In this regard, as shown in FIG. 8, an echo canceller 230 according to Variation of Embodiment 1 may have a function of switching, for the respective subbands, between performing and not performing the echo cancellation processing. FIG. 8 is a block diagram showing another example of the detailed functional structure of the echo canceller 130 according to Embodiment 1.

The echo canceller 230 is different from the echo canceller 130 shown in FIG. 2 in that switches 136a to 136f are newly provided. The following description omits features the same as those described with reference to FIG. 2 to focus on differences therefrom.

The switches 136a to 136f are connected between the respective pseudo-echo generation units 133a to 133f and the band division filter 132 and switch, based on control signals (not shown) input from the controller 112, whether or not to input the input audio signal for each subband to the respective pseudo-echo generation units 133a to 133f. In other words, the switches 136a to 136f switch, for respective subbands, between performing and not performing the echo cancellation processing.

Specifically, the controller 112 outputs a control signal so as to turn on only the switch connected to the pseudo-echo generation unit which processes a signal in a subband including a frequency band lower than or equal to the reproduction band of the output audio signal or the audio signal for transmission. Specifically, in the example shown in FIG. 3 or FIG. 4, the controller 112 turns the switches 136a and 136b on and the switches 136c to 136f off.

As above, the echo canceller 230 according to Variation of Embodiment 1 can perform minimized echo cancellation processing, which allows a reduction in the amount of computation for echo cancellation processing.

As mentioned above, the echo canceller 130 adopts a technique of estimating, using an adaptive filter, characteristics of sound transmission between the speaker 101 and the microphone 102 from moment to moment. In this case, it is conceivable that if the positional relationship between the speaker 101 and the microphone 102 changes drastically, estimating a transfer function using the adaptive filter might not be able to follow the change, which causes a failure in desired echo removal, or in a worst case scenario, incurs audio feedback.

Meanwhile, many of recent communication terminals are what is called video-phone terminals which transmit and receive not only audio signals, but also video signals at the same time. In some video-phone terminals and so on, a camera for capturing video and a microphone for capturing audio are integrated as a module. In this case, whether or not the module is moving can be presumed by analyzing signals which the camera for capturing video is receiving.

Specifically, when an entire image represented by video signals being received is moving, it is possible to infer that the module itself is moving, that is, it is expected that the positional relationship between the microphone 102 and the speaker 101 is changing. In such a case, there is a risk of a failure in removing echoes and in a worst case scenario, a risk of incurring audio feedback, and audio communication itself may therefore be suspended.

Figure 9:
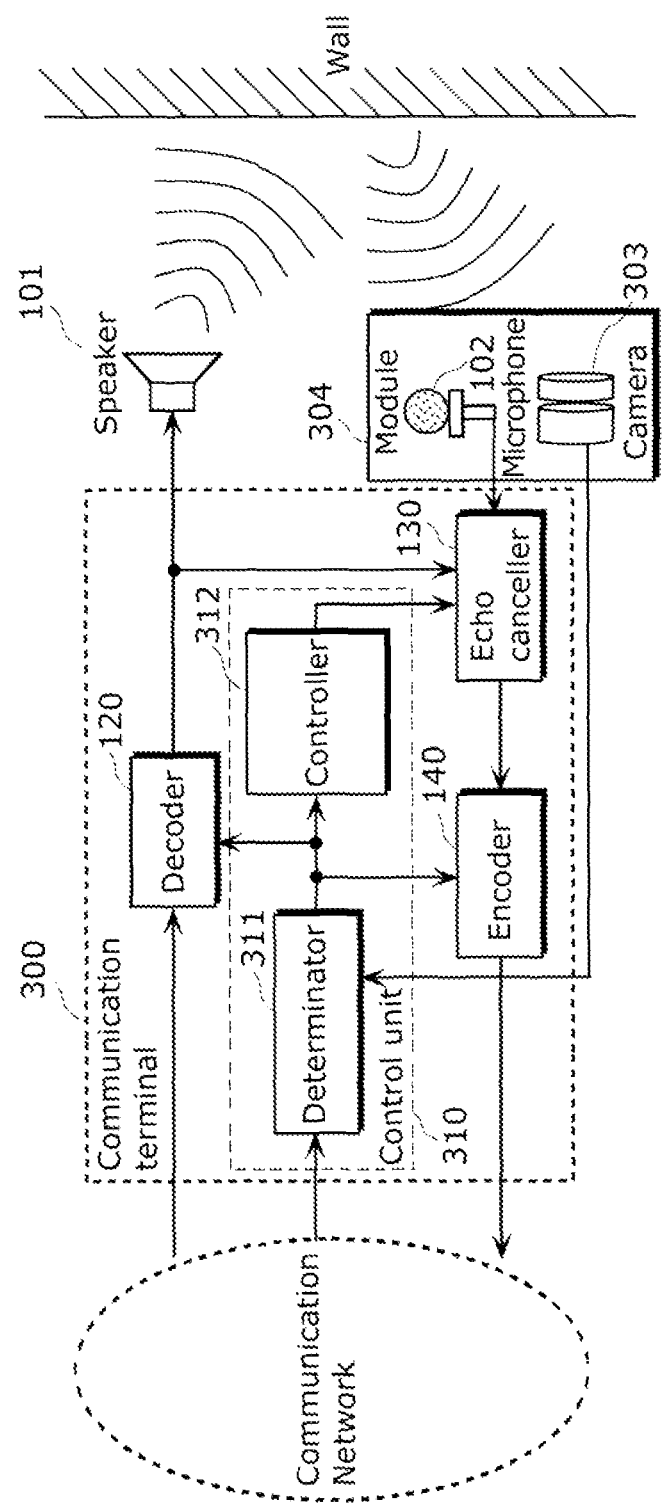
FIG. 9 is a block diagram showing another example of the structure of the communication terminal according to Embodiment 1.

FIG. 9 is a block diagram showing another example of the structure of the communication terminal 100 according to Embodiment 1. As shown in FIG. 9, the microphone 102 is provided as a module 304 which includes a camera 303. Furthermore, a communication terminal 300 shown in FIG. 9 is different from the communication terminal 100 shown in FIG. 1 in that a communication unit 310 is provided instead of the communication unit 110. Specifically, the control unit 310 is different in that a determinator 311 is provided instead of the determinator 111. The following description omits features the same as those described with reference to FIG. 1 to focus on differences therefrom.

The determinator 311 obtains a video signal itself which is input from the camera 303 for capturing video or information which is obtained from a signal input from the camera 303, and determines, based on the signal or the information, whether or not the module 304 including the camera 303 and the microphone 102 is moving. For example, when, by performing motion estimation processing on incoming video signals, it is determined that the entire image is moving, the determinator 311 determines that the module 304 is moving.

When it is inferred that the module 304 is moving, the determinator 311 then operates so as to suspend audio communication. For example, the determinator 311 suspends the coding processing which is performed by the encoder 140 and the echo cancellation processing which is performed by the echo canceller 130.

As above, the communication terminal 300 according to Variation of Embodiment 1 determines, based on a video signal input from the camera 303, whether or not the module 304 incorporating the microphone 102 and the camera 303 is moving, and suspends inappropriate audio communication based on a result of the determination. Thus, an audio signal on which the echo cancellation processing has not been properly performed or a signal by which audio feedback has been incurred can be prevented from being transmitted to the far end.

It may also be possible that the microphone 102 include a sensor which detects motion, such as an acceleration sensor, and based on information from such sensor, audio communication be suspended.

The type of a codec, the sampling frequency, the number of subbands, and the sampling rate of the downsampling in Embodiment 1 described above are an example and therefore may be different.

Embodiment 2

A communication terminal according to Embodiment 2 is a communication terminal which performs audio signal communication with another communication terminal and is characterized by comprising: an echo cancellation unit which obtains an input audio signal representing sound captured by a microphone and removes, for respective subbands, an echo component which is included in the obtained input audio signal and corresponds to an output audio signal provided from a speaker, to generate an audio signal for transmission; and a control unit which controls echo cancellation processing according to an amount of computation in processing performed by the communication terminal.

Figure 10:
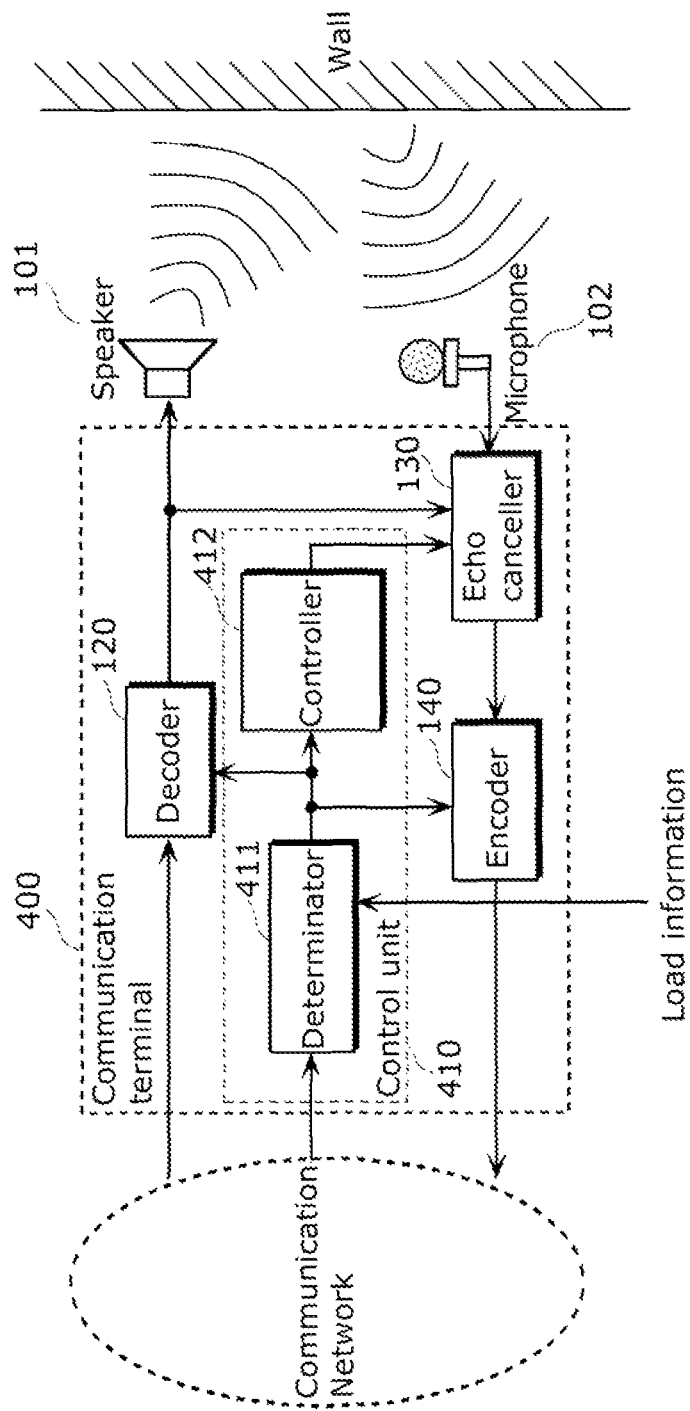
FIG. 10 is a block diagram showing an example of a structure of a communication terminal according to Embodiment 2.

FIG. 10 is a block diagram showing an example of a structure of a communication terminal 400 according to Embodiment 2. The communication terminal 400 shown in FIG. 10 is different from the communication terminal 100 shown in FIG. 1 in that a control unit 410 is provided instead of the control unit 110. The following description omits features the same as those described with reference to FIG. 1 to focus on differences therefrom.

The control unit 410 controls, for the respective subbands, echo cancellation processing of the echo canceller 130 according to an amount of computation in processing performed by the communication terminal 400. As shown in FIG. 10, the control unit 410 includes a determinator 411 and a controller 412.

The determinator 411 determines whether or not the amount of computation in processing performed by the communication terminal 400 exceeds a predetermined threshold. Specifically, the determinator 411 obtains processor computation load information indicating a state of a processor about a computation load thereof and determines, based on the obtained processor computation load information, whether or not the amount of computation of the processor exceeds a predetermined threshold. Here, the processor is a computation unit which actually performs each processing of the communication terminal 400, that is, specifically, the processing of the decoder 120, the echo canceller 130, the encoder 140, the determinator 411, and the controller 412.

The processor computation load information is, for example, information indicating a load of a function which the processor performs in parallel. In the case where the communication terminal 400 is what is called a video-phone terminal which transmits and receives video signals in parallel, an assumed usage state is, for example, that television broadcast is viewed on a parent screen while communication enabled by a video-phone system is underway on a child screen (i.e., a function congestion state). In such a case, the computation load on the processor increases, resulting in a decrease in the allocation of the amount of computation to the echo canceller 130, the encoder 140, or the like. In such a case, a codec with a low computation load is selected from among codecs available at the far end, to reduce the amount of computation.

Here, the predetermined threshold may be a fixed value that is predetermined. Alternatively, the threshold may be dynamically determined according to an amount of computation for other processing which the processor is requested to perform.

The determinator 411 may determine a reproduction band of the audio signal by determining a type of a codec and/or a sampling frequency which another communication terminal uses at the time of coding or decoding, as in the case of the determinator 111 according to Embodiment 1.

The controller 412 controls, for the respective subbands, echo cancellation processing of the echo canceller 130 according to an amount of computation in processing performed by the communication terminal 400. Specifically, when the determinator 411 determines that the amount of computation exceeds a predetermined threshold, the controller 412 controls the echo cancellation processing. Specific operations of the controller 412 will be described later.

Next, operations of the communication terminal 400 according to Embodiment 2 are described. Specifically, operations of the echo canceller 130 and the controller 412 are described.

Figure 11:
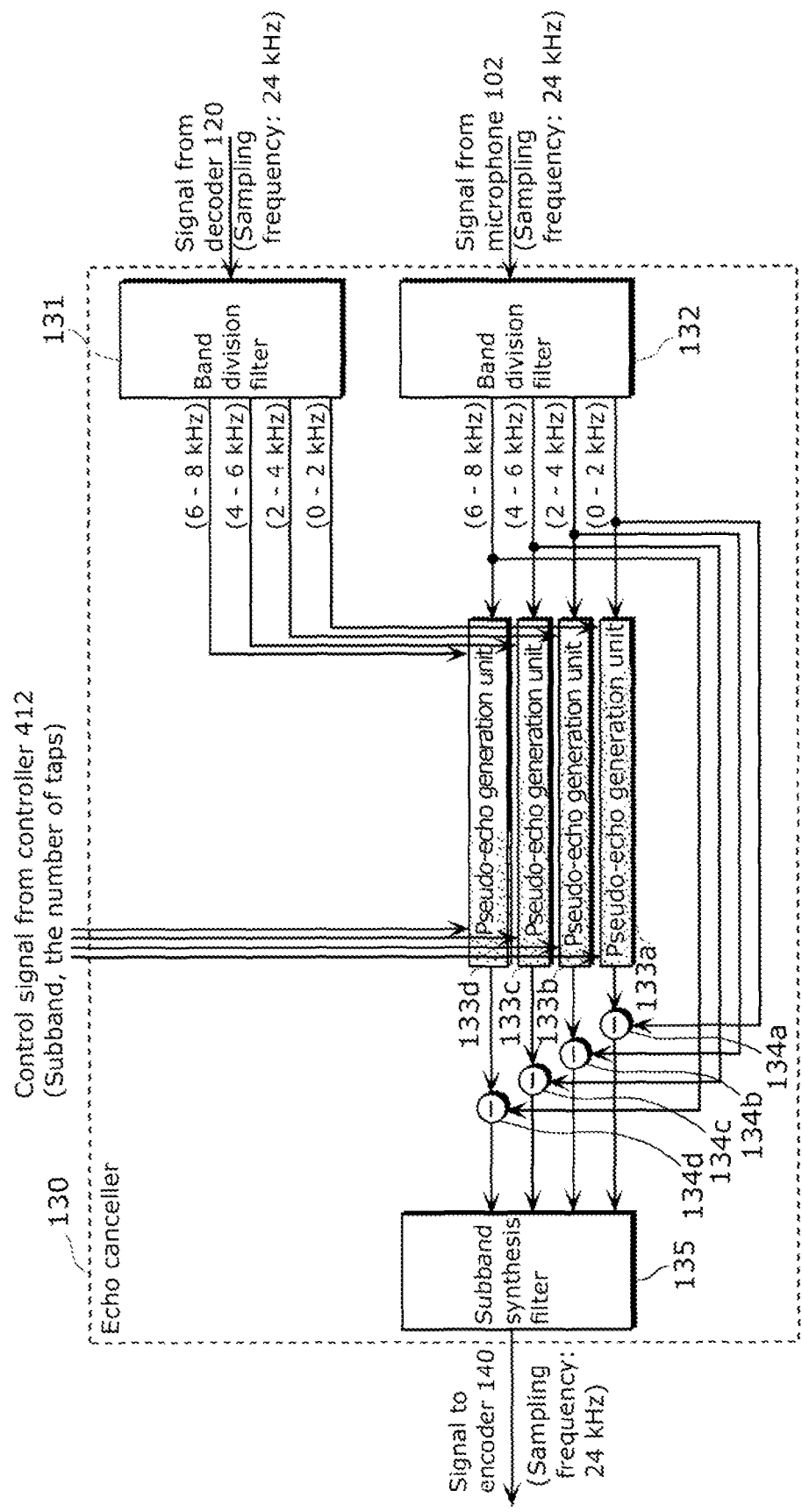
FIG. 11 is a view for explaining an example of an operation of an echo canceller according to Embodiment 2.

The following first describes, with reference to FIG. 11, a case where, when the amount of computation of the processor increases and exceeds a predetermined threshold, the controller 412 controls the reproduction band of the audio signal for transmission to be transmitted to another communication terminal. FIG. 11 shows an example of the functional structure of the echo canceller 130 where the sampling frequency of each of the PCM signal (the output audio signal) from the decoder 120 and the PCM signal (the input audio signal) from the microphone 102 is 24 kHz (the reproduction band of the signal is 12 kHz). In the example shown in FIG. 11, it is assumed that the determinator 411 determines that the decoding scheme available at the far end (another communication terminal) is AAC sampling frequency mode at 8 kHz to 24 kHz.

In this case, the sampling frequency of each of the PCM signal from the decoder 120 and the PCM signal from the microphone 102 has a sampling frequency is 24 kHz, which means that when television broadcast is not viewed, that is, when the amount of computation does not exceed a predetermined threshold, high-quality communication can be performed using the AAC sampling frequency mode at 24 kHz, as shown in FIG. 2. However, when viewing of television broadcast starts, that is, when the amount of computation exceeds a predetermined threshold, the controller 412 controls the echo canceller 130 so that the echo canceller 130 uses the AAC sampling frequency mode at 16 kHz, for example.

Specifically, when the determinator 411 determines that the amount of computation of the processor exceeds a predetermined threshold, the controller 412 provides the echo canceller 130 with instructions on the subband and the number of taps for echo cancellation processing. In the example shown in FIG. 11, since the sampling frequency is 16 kHz (meaning that the reproduction band is 8 kHz), the number of taps of each of the filters of the pseudo-echo generation units 133a to 133d is set to a predetermined number of taps which is sufficient to remove echoes, and the number of taps of each of the filters of the pseudo-echo generation units 133e and 133f is set to 0.

As above, when the amount of computation of the processor exceeds a predetermined threshold, the control unit 410 sets a narrower reproduction band for the audio signal for transmission to be transmitted to another communication. Accordingly, the control unit 410 sets, to 0 (or a sufficiently small value), the number of taps of a filter which is applied to a signal in a subband which is not to be transmitted.

By so doing, as shown in FIG. 11, not only the number of subbands which are processed by the echo canceller 130 can be reduced, but also the amount of computation of the encoder 140 itself can be reduced. Consequently, even when the amount of computation of the processor increases, it is possible to achieve, for example, communication which uses the communication terminal 400 according to Embodiment 2 while television broadcast is being viewed.

Although the foregoing has described the case where all the filters applied to signals in the respective subbands (the filters of the pseudo-echo generation units 133a to 133d) have the same number of taps, the filters may have different number of taps for each subband. As shown by shading in FIG. 11, the great length of taps is maintained for a signal in a low-frequency subband because it has a large impact on echoes, but for a signal in a high-frequency subband which has a small impact on echoes, the length of taps may be reduced so as to reduce the processing load. In FIG. 11, the area size of shading in the pseudo-echo generation unit for each subband indicates the number of taps of the corresponding filter.

The control unit 410 may set the number of taps in advance regardless of the amount of computation so that the number of taps increases or becomes equal as the frequency of the subband decreases. At this time, the control unit 410 may change the number of taps when the amount of computation exceeds a predetermined threshold or according to the reproduction band of the output audio signal or the audio signal for transmission.

Figure 12:
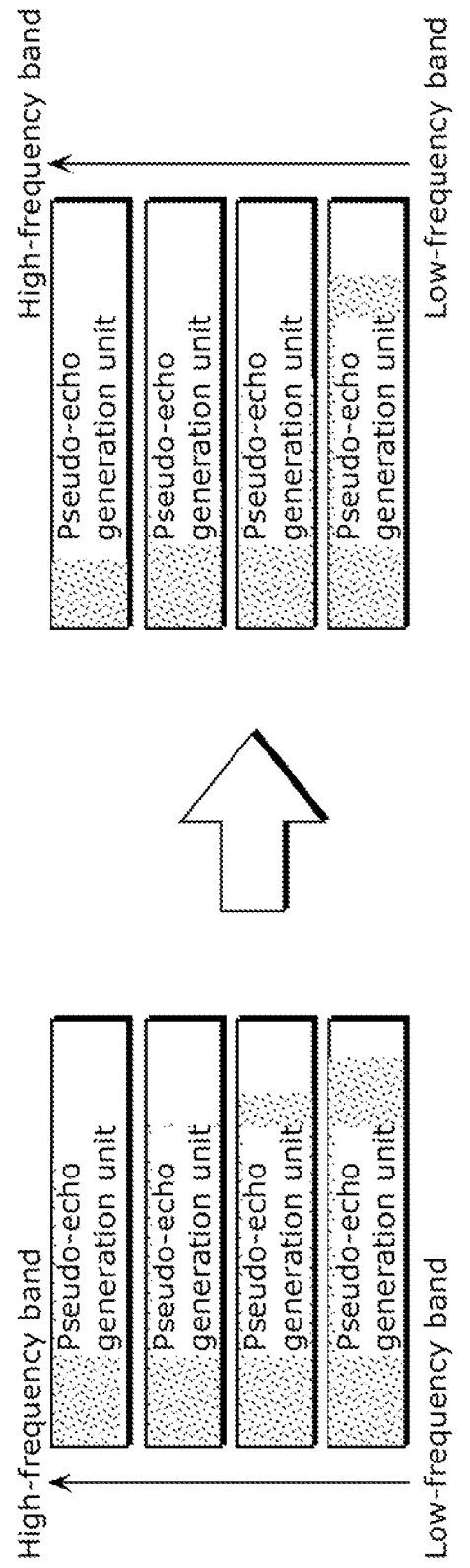
FIG. 12 is a schematic view for explaining processing of changing the number of taps while maintaining a relationship in the number of taps according to Embodiment 2.

Specifically, as shown in FIG. 12, the controller 412 may set a smaller number of taps for each subband in such a way that a subband-to-subband size relationship of the number of taps will be kept after the change in the number of taps. In other words, the number of taps may be set in such a way that, before and after the change in the number of taps, the number of taps of a filter which is applied in a low-frequency subband is larger than the number of taps of a filter which is applied in, a high-frequency subband.

In Embodiment 2 described above, the frequency supported by the encoder 140 or the number of taps in the echo canceller 130 is changed when the amount of computation of the processor is large. In this case, the sound quality of audio which is transmitted to the far end (another communication terminal) will be affected. In order to avoid this, a method of limiting, as shown in FIG. 13, the reproduction band of sound which is reproduced at the near end (a communication terminal 500) may be adopted.

Figure 13:
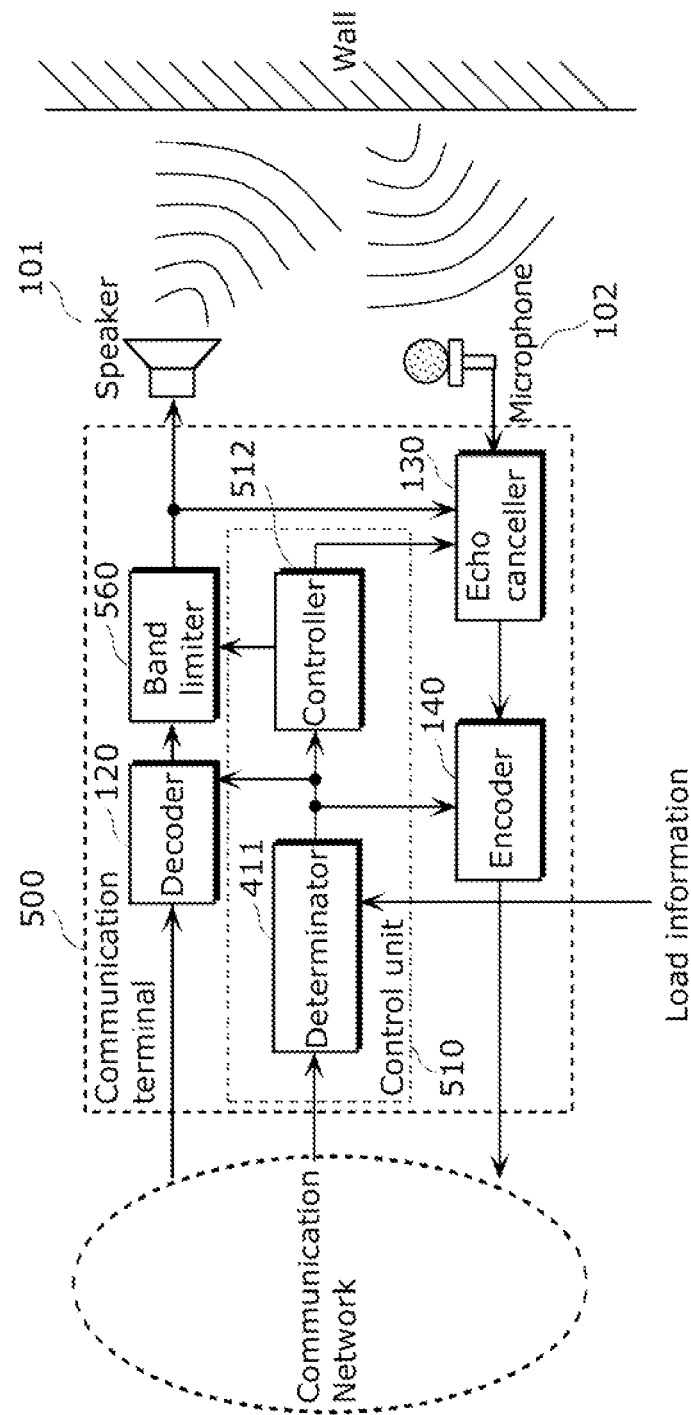
FIG. 13 is a block diagram showing another example of the structure of the communication terminal according to Embodiment 2.

FIG. 13 is a block diagram showing another example of the structure of the communication terminal according to Embodiment 2. The communication terminal 500 shown in FIG. 13 is different from the communication terminal 400 shown in FIG. 10 in that a control unit 510 is provided instead of the control unit 410 and a band limiter 560 is newly provided. Furthermore, the control unit 510 is different in that a controller 512 is provided instead of the controller 412. The following description omits features the same as those described with reference to FIG. 10 to focus on differences therefrom.

The band limiter 560 is an example of a band limiting unit according to an implementation of the present invention, which limits the reproduction band of the output audio signal and outputs, to the speaker 101, an output audio signal in the limited reproduction band. For example, under control of the controller 512, the band limiter 560 may attenuate a signal in a high-frequency band using a low-pass filter or may lower the sampling frequency itself using a downsampler.

When the amount of computation of the processor exceeds a predetermined threshold, the controller 512 determines a reproduction band which is limited by the band limiter 560, and controls the echo cancellation processing according to the determined reproduction band. Specific control on the echo cancellation processing is the same as what the above controller 112 or the like performs.

Figure 14:
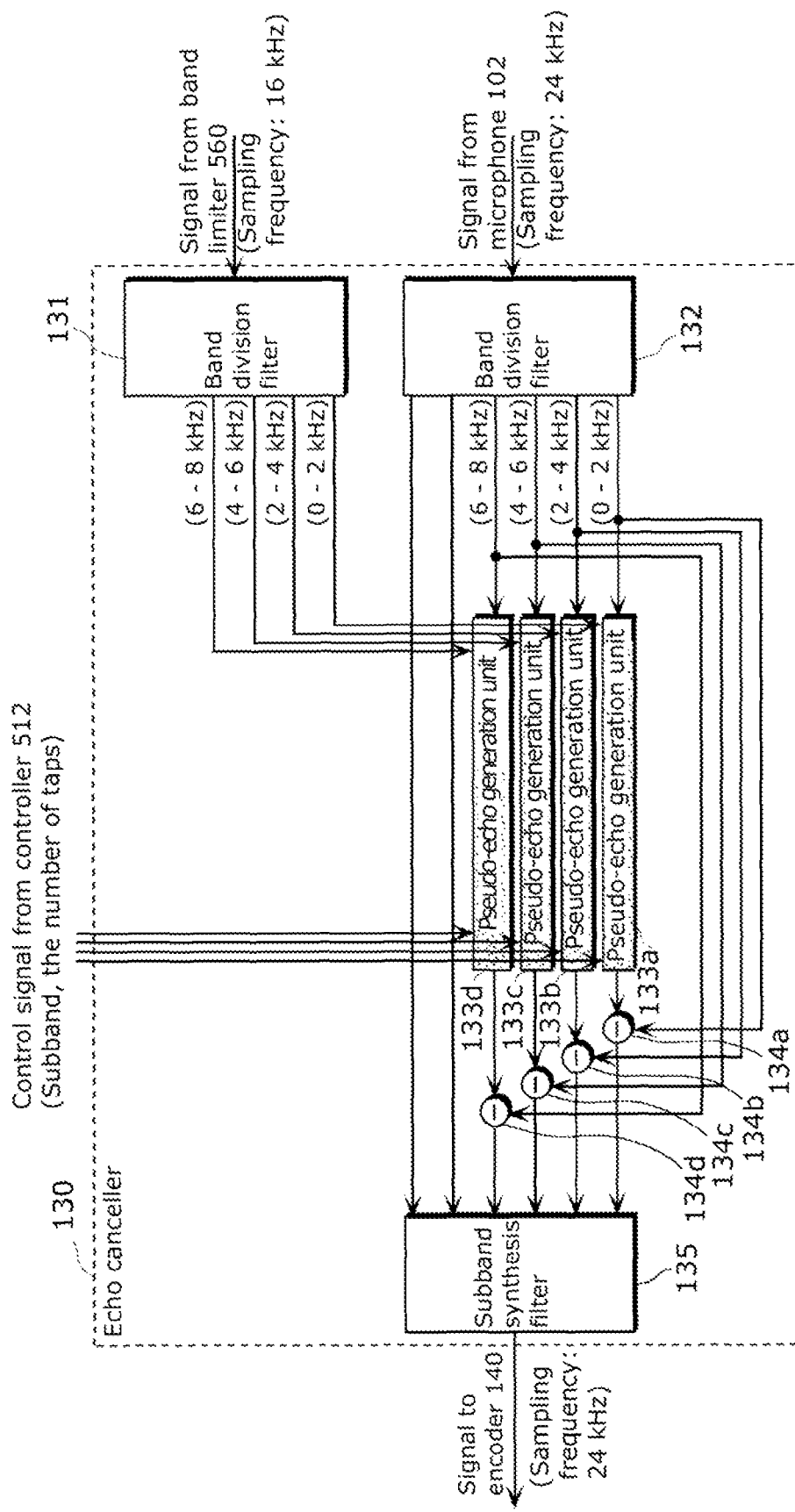
FIG. 14 is a block diagram showing another example of a detailed functional structure of the echo canceller according to Embodiment 2.

For example, assume that the band limiter 560 limits the band of the sampling frequency of the output audio signal from 24 kHz to 16 kHz, which means that the band limiter 560 limits the reproduction band of the output audio signal from 12 kHz to 8 kHz. FIG. 14 shows an example of the functional structure of the echo canceller 130 where the band is limited to 8 kHz.

Comparing FIG. 14 with FIG. 11, the band of signals which are input to the subband synthesis filter 135 is limited to 0 to 8 kHz in FIG. 11 while it is limited to a broader band (0 to 12 kHz) in FIG. 14. Furthermore, in both FIG. 14 and FIG. 11, no pseudo-echo generation processing is performed on signals in a high-frequency band (8 to 12 kHz).

This is because it is known that the echoes travelling in the space have no high-frequency components because the reproduction band of the output audio signal which is output from the speaker 101 is limited by the band limiter 560. By so doing, the high frequency band of audio which is transmitted to the far end is maintained, which makes it possible to provide good audio to a user at the far end and also possible to reduce the amount of computation for the echo cancellation processing in the communication terminal 500.

Although the band limiter 560 is provided as a method of limiting the reproduction band of the output audio signal in the above-described example, it may also be possible that signals in a high-frequency band are discarded when the decoder 120 decodes the input bitstream. In other words, it may also be possible that the decoder 120 decodes only signals in a low-frequency band out of the input bitstream.

Figure 15:
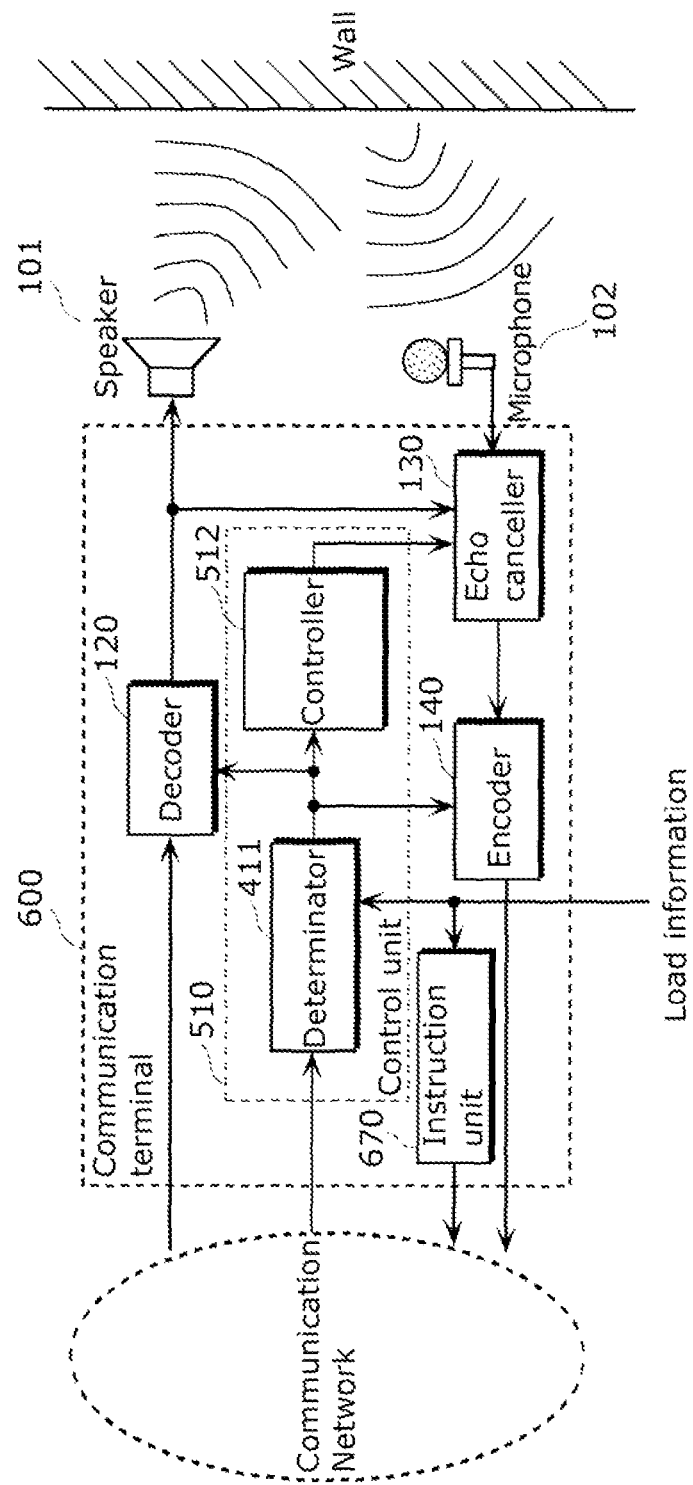
FIG. 15 is a block diagram showing another example of the structure of the communication terminal according to Embodiment 2.
Figure 16:
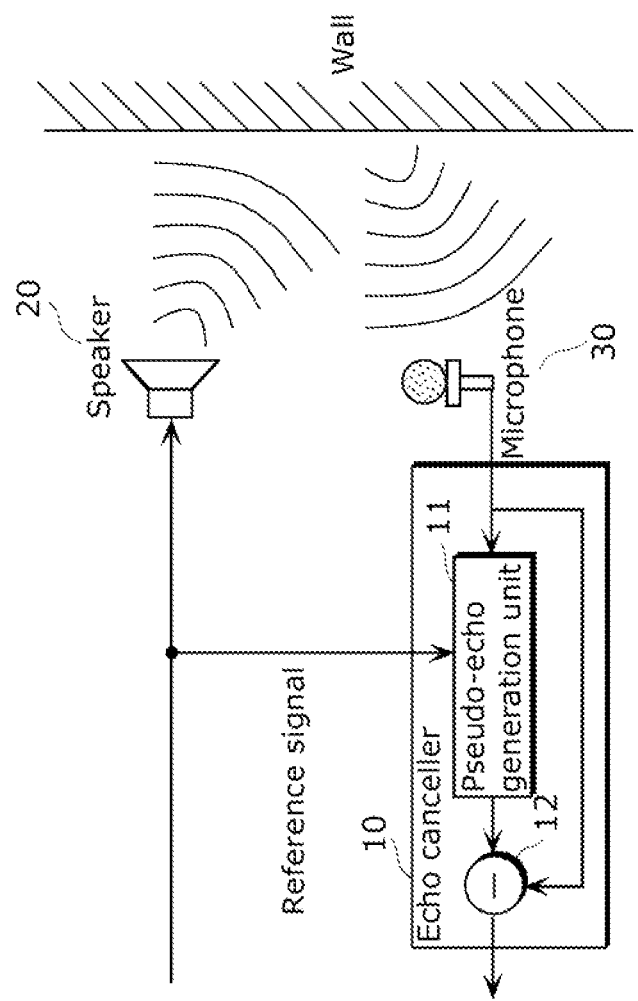
FIG. 16 shows a basic principle of a conventional echo canceller.

Furthermore, as in a communication terminal 600 shown in FIG. 15, it may be possible to give an instruction via the communication network such that the far end will limit the band by an encoder (or will use an encoder which supports a low sampling frequency). The communication terminal 600 shown in FIG. 15 is different from the communication terminal 400 shown in FIG. 10 in that a control unit 510 is provided instead of the control unit 410 and an instruction unit 670 is newly provided. The following description omits features the same as those described with reference to FIG. 10 to focus on differences therefrom.

The instruction unit 670 transmits, to another communication terminal, an instruction for limiting the reproduction band of an audio signal which is used by another communication terminal to generate an input bitstream when the amount of computation of the processor exceeds a predetermined threshold. Specifically, the instruction unit 670 transmits an instruction for setting, as the reproduction band which is supported by an encoder in another communication terminal, the reproduction band determined by the control unit 510.

By so doing, the high frequency band of audio which is transmitted from the communication terminal 600 to another communication is maintained, making it possible to provide good audio to a user at the far end and also possible to reduce the amount of computation for the echo cancellation processing in the communication terminal 600.

Furthermore, the processor computation load information may be, for example, information indicating reverberation characteristics of a room in which the speaker 101 and the microphone 102 are placed. Alternatively, the processor computation load information may be information indicating expected reverberation characteristics of the room in which the speaker 101 and the microphone 102 are placed. For example, the communication terminal 400 according to Embodiment 2 causes the speaker 101 to generate impulse sound and measures reverberation characteristics based on the impulse sound, thereby obtaining information which indicates reverberation characteristics of the room.

When the reverberation characteristics represent a long reverberation, the length of taps for generating pseudo echoes has to be large, which causes a decrease in the allocation of the amount of computation to a codec. In such a case, a codec which supports a low sampling frequency is selected from among codecs available at the far end, which allows not only a reduction in the amount of computation of an encoder, but also a reduction in the number of subbands and the number of taps in the echo canceller.

When the reverberation characteristics represent a short reverberation, the input audio signal is considered to include a small number of echo components, so that the number of taps of the filter and the number of subbands subject to the echo cancellation processing may be reduced.

It may also be possible that, regardless of the reproduction band of the audio signal which is processed by another communication terminal, the above-described control on the echo canceller 130 or the above-described limitation on the band of the output audio signal or the audio signal for transmission is carried out based only on the amount of computation of the processor of the communication terminal 400 according to Embodiment 2. For example, when the amount of computation exceeds a predetermined threshold, the control unit 410 may perform echo cancellation processing only part of the subbands that includes the lowest-frequency band and does not include the highest-frequency band. In other words, when the amount of computation exceeds a predetermined threshold, the control unit 410 may set, to 0, the number of taps of the filter which is applied in at least one of the subbands that includes the highest-frequency band and does not include the lowest-frequency band.

This is because, as described above, an echo in a low-frequency subband has a large impact while an echo in a high-frequency subband has a small impact, which means that the echo cancellation processing is desirably performed on a signal in at least a subband including the lowest-frequency band.

Although the communication terminal and the communication method according to the present invention have been described based on the embodiments, the present invention is not limited to these embodiments. Without departing from the scope of the present invention, the present invention includes an embodiment with some modifications on such embodiment, which are conceived by a person skilled in the art, or an embodiment obtained through combinations of the constituents of different embodiments.

For example, the present invention can not only be implemented as the communication terminal and the communication method as described above, but also be implemented as a program which causes a computer to execute the communication method according to an embodiment of the present invention. Furthermore, the present invention may be implemented as a computer-readable recording medium on which the above program is recorded, such as a compact disc read only memory (CD-ROM). Moreover, the present invention may be implemented as information, data, or signals which indicate the above program. In addition, these program, information, data, and signals may be distributed via a communication network such as the Internet.

Furthermore, part or all of the constituents included in the communication terminal may be provided in one system large scale integration (LSI). The system LSI is a super multifunctional LSI manufactured by integrating plural components into one chip and is specifically a computer system which includes a microprocessor, a read only memory (ROM), a random access memory (RAM) and so on.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The communication terminal and the communication method according to the present invention produce an effect that the amount of computation required for echo cancellation processing can be reduced, and are available, for example, for various communication devices such as a communication terminal for a video phone or a video conference.

The invention claimed is:

1. A communication terminal which performs audio signal communication with another communication terminal, the communication terminal comprising:
    a decoding unit configured to (i) decode an input bitstream received from the other communication terminal, to generate an output audio signal and (ii) output the generated output audio signal to a speaker;
    an echo cancellation unit configured to obtain an input audio signal and remove, for respective subbands, an echo component included in the obtained input audio signal, to generate an audio signal for transmission, the input audio signal representing sound captured by a microphone placed in a space to which the speaker outputs the sound, and the echo component corresponding to the output audio signal generated by the decoding unit;
    a coding unit configured to (i) code the audio signal for transmission to generate an output bitstream and (ii) transmit the generated output bitstream to the other communication terminal;
    a control unit configured to control, for the respective subbands, echo cancellation processing of the echo cancellation unit according to a reproduction band of at least one of the output audio signal and the audio signal for transmission; and
    an instruction unit configured to transmit an instruction to the other communication terminal when an amount of computation in processing performed by the communication terminal exceeds a predetermined threshold, the instruction being an instruction for limiting a reproduction band of an audio signal which is used by the other communication terminal in generating the input bitstream.

2. A communication terminal which performs audio signal communication with another communication terminal, the communication terminal comprising:
    a decoding unit configured to (i) decode an input bitstream received from the other communication terminal, to generate an output audio signal and (ii) output the generated output audio signal to a speaker;
    an echo cancellation unit configured to obtain an input audio signal and remove, for respective subbands, an echo component included in the obtained input audio signal, to generate an audio signal for transmission, the input audio signal representing sound captured by a microphone placed in a space to which the speaker outputs the sound, and the echo component corresponding to the output audio signal generated by the decoding unit;
    a coding unit configured to (i) code the audio signal for transmission to generate an output bitstream and (ii) transmit the generated output bitstream to the other communication terminal; and
    a control unit configured to control, for the respective subbands, echo cancellation processing of the echo cancellation unit according to an amount of computation in processing performed by the communication terminal,
    wherein the control unit is configured to perform the echo cancellation processing only in at least one of the subbands when the amount of computation exceeds a predetermined threshold, the at least one subband including a lowest-frequency band and not including a highest-frequency band.

* * * * *